(12) United States Patent
Blandino et al.

(10) Patent No.: US 12,426,635 B2
(45) Date of Patent: Sep. 30, 2025

(54) APPARATUS FOR AEROSOL GENERATING DEVICE

(71) Applicant: NICOVENTURES TRADING LIMITED, London (GB)

(72) Inventors: Thomas Paul Blandino, Madison, WI (US); Keith George Beidelman, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 1053 days.

(21) Appl. No.: 17/593,192

(22) PCT Filed: Mar. 9, 2020

(86) PCT No.: PCT/EP2020/056220
§ 371 (c)(1),
(2) Date: Sep. 10, 2021

(87) PCT Pub. No.: WO2020/182731
PCT Pub. Date: Sep. 17, 2020

(65) Prior Publication Data
US 2022/0183377 A1 Jun. 16, 2022

Related U.S. Application Data

(60) Provisional application No. 62/816,277, filed on Mar. 11, 2019, provisional application No. 62/816,286, (Continued)

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/53* (2020.01); *A24F 40/57* (2020.01);
(Continued)

(58) Field of Classification Search
CPC ........ A24F 40/465; A24F 40/53; A24F 40/50; A24F 40/57; A24F 40/20; H05B 6/108; H05B 6/105; H05B 6/06; H02M 1/083
See application file for complete search history.

(56) References Cited

U.S. PATENT DOCUMENTS

| 2016/0248280 A1 | 8/2016 | Ben-Shalom et al. |
| 2019/0008210 A1 | 1/2019 | Mironov et al. |
| 2020/0163386 A1* | 5/2020 | Courbat .................. A24F 40/50 |

FOREIGN PATENT DOCUMENTS

| CN | 204906749 U | 12/2015 |
| CN | 106455713 A * | 2/2017 ........... A24B 15/167 |

(Continued)

OTHER PUBLICATIONS

International Search Report and Written Opinion of International Application No. PCT/EP2020/056220, mailed Aug. 26, 2020, 22 pages.

*Primary Examiner* — Marcus E Harcum
(74) *Attorney, Agent, or Firm* — Burr & Forman

(57) ABSTRACT

An apparatus for an aerosol generating device is described. The apparatus includes an induction heating circuit including an inductive element for inductively heating a susceptor arrangement to heat an aerosol generating material to thereby generate an aerosol, a capacitive element, and a switching arrangement that in use alternates between a first state and a second state to enable a varying current to be generated from a DC voltage supply and flow through the inductive element to cause inductive heating of the susceptor arrangement. The circuit also includes a control arrangement (Continued)

configured to switch the switching arrangement from the first state to the second state in response to a first voltage condition being detected in the circuit, and to switch the switching arrangement from the second state to the first state in response to a second voltage condition being detected in the circuit.

22 Claims, 16 Drawing Sheets

Related U.S. Application Data filed on Mar. 11, 2019, provisional application No. 62/816,276, filed on Mar. 11, 2019.

(51) Int. Cl.
*A24F 40/53* (2020.01)
*A24F 40/57* (2020.01)
*H05B 6/06* (2006.01)
*H05B 6/10* (2006.01)
*H02M 1/08* (2006.01)

(52) U.S. Cl.
CPC ............... *H05B 6/06* (2013.01); *H05B 6/105* (2013.01); *H02M 1/083* (2013.01)

(56) References Cited

FOREIGN PATENT DOCUMENTS

| CN | 106455715 A | * | 2/2017 | ........... A24B 15/167 |
|---|---|---|---|---|
| WO | WO-2016000141 A1 | * | 1/2016 | ........... A24F 47/008 |
| WO | 2017085242 A1 | | 5/2017 | |
| WO | 2018073376 A1 | | 4/2018 | |
| WO | 2018178095 A1 | | 10/2018 | |

* cited by examiner

APPARATUS FOR AEROSOL GENERATING DEVICE

PRIORITY CLAIM

The present application is a National Phase entry of PCT Application No. PCT/EP2020/056220, filed Mar. 9, 2020, which claims priority from U.S. Provisional Application No. 62/816,276, filed Mar. 11, 2019, and U.S. Provisional Application No. 62/816,277, filed Mar. 11, 2019 and U.S. Provisional Application No. 62/816,286, filed Mar. 11, 2019, each of which is hereby fully incorporated herein by reference.

TECHNICAL FIELD

The present disclosure relates to an apparatus for an aerosol generating device.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided apparatus for an aerosol generating device. The apparatus comprising: an induction heating circuit comprising: an inductive element for inductively heating a susceptor arrangement to heat an aerosol generating material to thereby generate an aerosol, a capacitive element, and a switching arrangement that in use alternates between a first state and a second state to enable a varying current to be generated from a DC voltage supply and flow through the inductive element to cause inductive heating of the susceptor arrangement. The apparatus further includes a control arrangement, wherein the control arrangement is configured to switch the switching arrangement from the first state to the second state in response to a first voltage condition being detected in the circuit, and the control arrangement is configured to switch the switching arrangement from the second state to the first state in response to a second voltage condition being detected in the circuit.

The first voltage condition may be indicative of an amount of magnetic energy which is stored in the inductive element due to the DC current flowing through the inductive element.

The switching arrangement in the first state may allow a DC current to flow through the inductive element and thereby magnetic energy to be stored in the inductive element, and the switching arrangement in the second state may prevent a DC current flowing through the inductive element such that when the switching arrangement is in the second state current may oscillate between the inductive element and the capacitive element.

The control arrangement may comprise a voltage comparator and the voltage comparator may be configured to detect the first voltage condition by comparing a voltage indicative of the amount of DC current flowing through the inductive element to a control voltage.

The circuit may further comprise a resistor and the voltage indicative of the amount of DC current flowing through the inductive element is dependent on a voltage across the resistor.

The control voltage may be modifiable to control a power supplied to the circuit.

The apparatus may comprise a controller configured to determine a power supplied to the circuit and compare the power supplied to the circuit to a target power, and to control the control voltage based on the comparison between the power supplied to the circuit and the target power.

The second voltage condition may be indicative that a given proportion of a cycle of current oscillation between the inductive element and the capacitive element has been completed since the switching arrangement was configured from the first state to the second state.

The control arrangement may comprise a zero-voltage detector and the zero-voltage detector may be configured to detect the second voltage condition, and the second voltage condition may be a zero-voltage condition or a near zero-voltage condition across the switching arrangement which when detected by the zero-voltage detector is indicative that a half-cycle of current oscillation between the inductive element and the capacitive element has been completed since the switching arrangement was configured from the first state to the second state.

The control arrangement may comprise a flip-flop configurable between two states, and the state of the switching arrangement may be dependent on the state of the flip-flop, and the control arrangement may be configured to detect the first voltage condition and the second voltage condition and change the state of the flip-flop to change the state of the switching arrangement.

The control arrangement may comprise a comparator configured to detect the first voltage condition, and the flip-flop may be configured to receive a first input from the comparator if the comparator detects the first voltage condition and a second input from the zero-voltage detector if the zero-voltage detector detects the second voltage condition.

The switching arrangement may comprise a FET.

The control arrangement may be configured to switch the state of the FET by selectively causing a voltage to be provided to a gate terminal of the FET.

The inductive element and the capacitive element may be arranged in parallel with one another in the induction heating circuit.

The inductive element, capacitive element and switching arrangement may be arranged in a first resonator section and the apparatus may further comprise a second resonator section comprising a second inductive element, a second capacitive element and a second switching arrangement, wherein: the second inductive element is configured for inductively heating the susceptor arrangement to heat an aerosol generating material to thereby generate an aerosol, the second switching arrangement in use alternates between a first state and a second state to enable a varying current to be generated from the DC voltage supply and flow through the second inductive element to cause inductive heating of the susceptor arrangement, and the control arrangement may be configured when the first resonator section is active to: switch the first switching arrangement from the first state to the second state in response to the first voltage condition being detected in the first resonator section circuit, and switch the first switching arrangement from the second state to the first state in response to the second voltage condition being detected in the first resonator section, and the control arrangement may be configured when the second resonator section is active to: switch the second switching arrangement from the first state to the second state in response to the first voltage condition being detected in the second resonator section circuit, and switch the second switching arrangement from the second state to the first state in response to the second voltage condition being detected in the second resonator section.

The apparatus may comprise a controller configured to selectively activate the first resonator section and the second resonator section such that only one of the first resonator section and the second resonator section is active at any one time.

According to a second aspect of the present disclosure there is provided an aerosol generating device comprising apparatus according to the first aspect of the present disclosure.

The device may be a tobacco heating device, also known as a heat-not-burn device.

According to a third aspect of the present disclosure there is provided a control arrangement for controlling an induction heating circuit of an aerosol generating device, wherein: the control arrangement is configured to control a switching arrangement in the induction heating circuit to in use cause the switching arrangement to switch between a first state and a second state to enable a varying current to be generated from a DC voltage supply and flow through an inductive element in the inductive heating circuit to cause inductive heating of a susceptor arrangement, and wherein the control arrangement is configured to switch the switching arrangement from the first state to the second state in response to a first voltage condition being detected in the circuit, and the control arrangement is configured to switch the switching arrangement from the second state to the first state in response to a second voltage condition being detected in the circuit.

The control arrangement may be configured to: detect the first voltage condition and the second voltage condition in the induction heating circuit and in response to detecting the first voltage condition, switch the switching arrangement from the first state to the second state; and in response to detecting the second voltage condition, switch the switching arrangement from the second state to the first state.

According to a fourth aspect of the present disclosure there is provided an aerosol generating system comprising an aerosol generating device according to the third aspect and an article comprising an aerosol generating material for being heated by the device in use to thereby generate an aerosol.

The aerosolizable material may comprise a tobacco material.

According to a fifth aspect of the present disclosure, there is provided apparatus for an aerosol generating device, comprising an induction heating circuit comprising: an inductive element for inductively heating a susceptor arrangement to heat an aerosol generating material to thereby generate an aerosol, a capacitive element, and a switching arrangement that, in use alternates between a first state and a second state to enable a varying current to be generated from a DC voltage supply and flow through the inductive element to cause inductive heating of the susceptor arrangement. The apparatus can further include a controller configured to: measure a DC voltage and a DC current supplied to the induction heating circuit by the DC voltage supply and determine from the measured DC voltage and DC current a power supplied to the circuit and control switching of the switching arrangement based on a comparison of the determined power supplied to the circuit to a target power.

The controller may be configured to control the power supplied to the circuit by controlling switching of the switching arrangement.

The switching arrangement may in the first state allow a DC current to flow through the inductive element and thereby for magnetic energy to be stored in the inductive element, and the switching arrangement in the second state may prevent a DC current flowing through the inductive element such that when the switching arrangement is in the second state current may oscillate between the inductive element and the capacitive element.

The controller may be configured to control the power supplied to the circuit by controlling an amount of DC current allowed to build up in the inductive element before the controller switches the state of the switching arrangement from the first state to the second state.

The apparatus may comprise a control arrangement configured to detect that the given amount of DC current has been allowed to build up in the inductive element by detecting a first voltage condition in the circuit.

The control arrangement may comprise a comparator configured to detect the first voltage condition by comparing a voltage in the circuit to a control voltage and the controller may be configured to adjust the control voltage to control the power supplied to the circuit.

The control voltage may be resultant of a time varying voltage output by the controller, the time varying voltage having a duty cycle, and the controller being configured to adjust the control voltage by adjusting the duty cycle of the time varying voltage.

The controller may be configured to control the power supplied to the circuit by determining a power supplied to the circuit during a first time interval and adjusting the power supplied to the circuit for a subsequent time interval based on a comparison of the determined power supplied to the circuit during the first pre-determined time interval and the target power.

The controller may be configured to control the power supplied to the circuit throughout a usage session comprising a plurality of pre-determined intervals by comparing once per pre-determined interval the determined power supplied to the circuit to the target power.

The first pre-determined time interval and/or the subsequent pre-determined time interval may be of a length of $1/80$ s to $1/20$ s or of a length of around $1/64$ s.

The controller may be configured to increase the power supplied to the circuit for the subsequent time interval if the power supplied during the first pre-determined time interval is less than the target power.

The controller may be configured to determine the power supplied to the circuit based on a measured voltage indicative of a current drawn from the DC voltage supply over the first pre-determined interval.

The voltage indicative of the current drawn from the DC voltage supply may be substantially constant over the duration of the first pre-determined interval.

The controller may be configured to control the power supplied during the subsequent time interval by adjusting a control voltage by a pre-determined amount.

The controller may be configured to set the control voltage at a first value for the first pre-determined interval, wherein the first value is less than a value for the control voltage found to correspond to the target power.

The target power may be a target power range, for example a range of 10 to 30 W or a range of 15 W to 25 W, and the controller may be configured to not adjust control of the switching arrangement if the determined power supplied is within the target power range.

The controller may be configured to adjust the target power throughout a usage session of the device.

The controller may be configured to monitor a temperature of the susceptor arrangement and reduce the target power at a point during the usage session when the temperature of the susceptor arrangement has reached a predetermined target temperature.

The target power may remain constant such that the controller is configured, if the voltage supplied by the DC voltage supply changes, to control the switching arrangement to maintain a substantially constant power supplied to the circuit.

The inductive element, capacitive element and switching arrangement may be arranged in a first resonator section and the apparatus may further comprise a second resonator section comprising a second inductive element, a second capacitive element and a second switching arrangement, wherein: the second inductive element is configured for inductively heating the susceptor arrangement to heat an aerosol generating material to thereby generate an aerosol. The second switching arrangement in use alternates between a first state and a second state to enable a varying current to be generated from the DC voltage supply and flow through the second inductive element to cause inductive heating of the susceptor arrangement. The controller may be configured to selectively activate the first resonator section and the second resonator section such that only one of the first resonator section and the second resonator section is active at any one time and the controller may be configured to: measure a DC voltage and a DC current supplied to one of the first resonator section and the second resonator section and determine from the measured DC voltage and DC current a power supplied to the circuit and control switching of the switching arrangement of the active resonator section based on a comparison of the determined power supplied to the circuit to a target power.

The controller may be configured throughout a usage session to determine the power supplied to the circuit by determining the power supplied to one of the first resonator section and the second resonator section.

The controller may be configured at a first part of a usage session to determine the power supplied to the circuit by determining a power supplied to the first resonator section and at a second part of the usage session to determine the power supplied to the circuit by determining a power supplied to the second resonator section.

According to a sixth aspect of the present disclosure there is provided an aerosol generating device comprising an apparatus according to the first aspect of the present disclosure.

The device may be a tobacco heating device, also known as a heat-not-burn device.

According to a seventh aspect of the present disclosure there is provided a method for a controller of an apparatus for an aerosol generating device. The apparatus comprises an induction heating circuit comprising: an inductive element for inductively heating a susceptor arrangement to heat an aerosol generating material to thereby generate an aerosol, a capacitive element, and a switching arrangement that, in use alternates between a first state and a second state to enable a varying current to be generated from a DC voltage supply and flow through the inductive element to cause inductive heating of the susceptor arrangement. The apparatus further includes the controller. The method can comprise measuring a DC voltage and a DC current supplied to the induction heating circuit by the DC voltage supply and determining from the measured DC voltage and DC current a power supplied to the circuit and controlling switching of the switching arrangement based on a comparison of the determined power supplied to the circuit to a target power.

According to an eighth aspect of the present disclosure there is provided a set of machine-readable instructions which when executed cause the method according to the third aspect to be performed.

According to a ninth aspect of the present disclosure there is provided a machine-readable medium comprising a set of instructions according to the fourth aspect.

According to a tenth aspect of the present disclosure there is provided an aerosol generating system comprising an aerosol generating device according to the second aspect and an article comprising an aerosol generating material for being heated by the device in use to thereby generate an aerosol.

In the aerosol generating system, the aerosol generating material comprises a tobacco material.

According to other examples of the present disclosure there is provided apparatus for an aerosol generating device comprising: a heating circuit comprising: a heating arrangement arranged in use to heat an aerosol generating material to thereby generate an aerosol and a power supply for supplying a power to the heating circuit to heat the aerosol generating material. The apparatus further includes a controller configured to: determine a power supplied to the heating circuit to heat the aerosol generating material and control the power supplied to the heating circuit based on a comparison of the determined power supplied to a target power, wherein the controller is configured to adjust the target power throughout a usage session of the device.

The controller may be configured to reduce the target power during a usage session. The controller may be configured to reduce the target power from a first value during a first part of a usage session to a second value during a second part of a usage session. The heating arrangement may comprise one or more heating zones and the first part of the usage session may comprise the device supplying power to substantially increase a temperature of one or more of the heating zones. The second part of the usage session may comprise the device supplying power to substantially maintain a temperature of the heating zones. The first value for the target power may be from 15 W to 23 W. The second value for the target power may be from 9 W to 13 W. The target power may be a range. The first value for the target power may be around 20 W, or may be a range of 20 W to 21 W. The second value for the target power may around 12 W or may be a range of 12 W to 13 W.

The controller may be configured to reduce the supplied power if the supplied power exceeds the target power and decrease the supplied power if the supplied power is less than the target power. Where the target power is a range, the controller may be configured not to adjust the supplied power when the supplied power is determined to be in the target range. The heating arrangement may comprise one or more resistive heating elements or one or more inductive heating elements. The one or more heating elements may be arranged to heat the one or more heating zones. The determined power may be a power supplied to either or both of the heating elements.

According to an eleventh aspect of the present disclosure, there is provided apparatus for an aerosol generating device, comprising: an induction heating circuit comprising a first inductive element and a second inductive element, the first inductive element and the second inductive element for inductively heating a susceptor arrangement to heat an aerosol generating material to thereby generate an aerosol. The apparatus further comprises a controller for controlling activation of the first inductive element and the second inductive element, wherein: the controller is configured to selectively activate the first inductive element and the second inductive element such that only one of the first inductive element and the second inductive element is active at any one time, and the controller is configured to determine at pre-determined intervals which of the first inductive element and the second inductive element to activate.

The controller may be configured to determine at pre-determined intervals which of the first inductive element and the second inductive element to activate by determining once for each of a plurality of pre-determined intervals which of the first inductive element and the second inductive element to activate for a first pre-determined interval of the plurality of pre-determined intervals.

The susceptor may comprise a first susceptor zone and a second susceptor zone and the first inductive element may be arranged to heat the first susceptor zone and the second inductive element arranged to heat the second susceptor zone, and the controller may be configured to determine which of the first inductive element and the second inductive element to activate based on a determination of which of the first susceptor zone and the second susceptor zone is to be heated for the first pre-determined interval.

The controller may be configured to make the determination of which of the first susceptor zone and the second susceptor zone is to be heated for the first pre-determined interval based on a comparison of a measured temperature of the first susceptor zone to a first target temperature and a comparison of a measured temperature of the second susceptor zone to a second target temperature.

The controller may be configured to: determine if the temperature of the first susceptor zone is below the first target temperature, determine if the temperature of the second susceptor zone is below the second target temperature, activate the first inductive element for the first pre-determined interval if the controller determines that the temperature of the first susceptor zone is below the first target temperature and the temperature of the second susceptor zone is not below the second target temperature, activate the second inductive element for the first pre-determined interval if the controller determines that the temperature of the second susceptor zone is below the second target temperature and the temperature of the first susceptor zone is not below the first target temperature, and activate one of the first inductive element and the second inductive element for the first pre-determined interval if the controller determines that the temperature of the first susceptor zone is below the first target temperature and the temperature of the second susceptor zone is below the second target temperature.

The controller may be configured, if both the measured temperature of the first susceptor zone remains below the first target temperature and the measured temperature of the second susceptor zone remains below the second target temperature for one or more pre-determined intervals following the first pre-determined interval, to activate one of the first inductive element and the second inductive element for each pre-determined interval of the one or more intervals following the first pre-determined interval such that the first inductive element and the second inductive element are alternately active for each pre-determined interval.

The pre-determined intervals may be of length $\frac{1}{80}$ s to $\frac{1}{20}$ s or around $\frac{1}{64}$ s.

The circuit may comprise: a first resonator section comprising the first inductive element, a first capacitive element, and a first switching arrangement that in use alternates between a first state and a second state to enable a varying current to be generated from a DC voltage supply and flow through the first inductive element to cause inductive heating of the susceptor arrangement and; a second resonator section comprising the second inductive element, a second capacitive element, and a second switching arrangement that in use alternates between a first state and a second state to enable a varying current to be generated from the DC voltage supply and flow through the second inductive element to cause inductive heating of the susceptor arrangement. The controller may be configured, in order to selectively activate the first inductive element and the second inductive element, to selectively activate the first resonator section and the second resonator section such that only one of the first resonator section and the second resonator section is active at any one time.

The circuit may comprise control means configured to control the first switching arrangement and the second switching arrangement.

The control means may comprise a first driver for operating the first switching arrangement and a second driver for operating the second switching arrangement and the controller is configured to activate the first resonator section by selectively providing a signal to the first driver and to activate the second resonator section by selectively providing a signal to the second driver.

The control means may be configured to switch the switching means of the active resonator section from the first state to the second state in response to the control means detecting a first voltage condition in the active resonator section.

The control means may be configured to switch the switching means of the active resonator section from the second state to the first state in response to the control means detecting a second voltage condition in the active resonator section.

The first voltage condition may be indicative of an amount of magnetic energy which is stored in the active inductive element due to the DC current flowing through the active inductive element.

The second voltage condition may be indicative that a given proportion of a cycle of current oscillation between the inductive element and the capacitive element of the active resonator section has been completed since the switching arrangement of the active resonator section was configured from the first state to the second state.

According to a twelfth aspect of the present disclosure there is provided an aerosol provision device comprising apparatus according to the first aspect of the present disclosure.

The device may be a tobacco heating device, also known as a heat-not-burn device.

According to a thirteenth aspect of the present disclosure there is provided a method for a controller of apparatus for an aerosol generating device, the apparatus comprising: an induction heating circuit comprising a first inductive element and a second inductive element, the first inductive element and the second inductive element for inductively heating a susceptor arrangement to heat an aerosol generating material to thereby generate an aerosol; and the controller, wherein the controller is configured to control activation of the first inductive element and the second inductive element to heat the susceptor arrangement; wherein the method comprises: selectively activating the first inductive element and the second inductive element such that only one of the first inductive element and the second inductive element is active at any one time; and determining at pre-determined intervals which of the first inductive element and the second inductive element to activate.

According to a fourteenth aspect of the present disclosure there is provided a set of machine-readable instructions which when executed cause the method according to the third aspect to be performed.

According to a fifteenth aspect of the present disclosure there is provided a machine-readable medium comprising a set of instructions according to the fourth aspect.

According to a sixteenth aspect of the present disclosure there is provided an aerosol generating system comprising an aerosol generating device according to the second aspect and an article comprising an aerosol generating material for being heated by the device in use to thereby generate an aerosol.

Optionally, the aerosol generating material comprises a tobacco material.

Further features and advantages of the present disclosure will become apparent from the following description of embodiments, given by way of example only, which is made with reference to the accompanying drawings.

DETAILED DESCRIPTION

Figure 1:
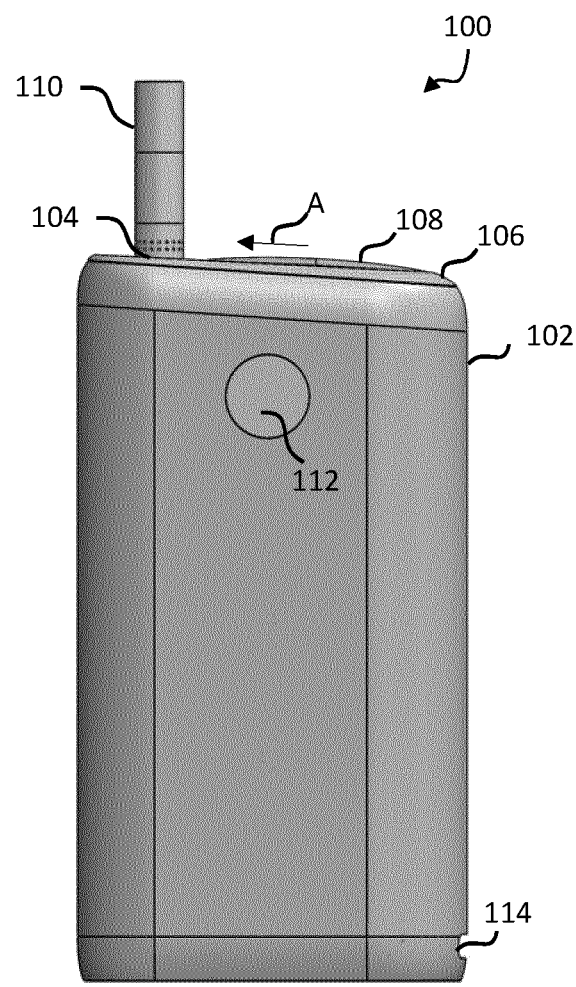
FIG. 1 shows a front view of an example of an aerosol generating device according to an embodiment.

As used herein, the term "aerosol generating material" includes materials that provide volatized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatus is known that heats aerosol generating material to volatilize at least one component of the aerosol generating material, typically to form an aerosol which can be inhaled, without burning or combusting the aerosol generating material. Such apparatus is sometimes described as an "aerosol generating device", an "aerosol provision device", a "heat-not-burn device", a "tobacco heating product device" or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

Herein, examples of apparatus for an aerosol generating system which is configured to produce an aerosol by inductively heating of an aerosol generating material is described. In examples, the apparatus comprises an inductive element, which may be an inductor coil, for heating a susceptor arrangement. The susceptor arrangement is arranged to heat the aerosol generating material to generate an aerosol. In examples, the apparatus allows a varying current to be generated through the inductive element from a DC voltage supply, such as a battery. In order to provide the varying current from the DC voltage supply, a switching arrangement is provided which is switchable between a first state and a second state. To provide the switching of the switching arrangement between the first state and the second state, a control arrangement is provided which is configured to switch the switching arrangement from the first state to the second state in response to a first voltage condition being detected in the circuit. The control arrangement is also configured to switch the switching arrangement from the second state to the first state in response to a second voltage condition being detected in the circuit.

Accordingly, an induction heating apparatus for an aerosol generating system which generates an aerosol for inhalation by a user is provided which allows a varying current to produce the inductive heating from the DC voltage supply. The control arrangement operating the switching arrangement in response to detected voltage conditions in the circuit allows the circuit to "self-oscillate" to produce the varying current, as will be described in detail below. Examples herein may provide for a varying current to be produced without the use of a dedicated component such as an inverter for producing a varying current. In some examples, at least one of the first and second voltage conditions is at least partly dependent on a resonant frequency of the circuit, and as such, the self-oscillating operation of the circuit takes into account the resonant frequency of the circuit, without it being necessary for the resonant frequency to be determined by a controller or the like.

In some examples, the control arrangement detects the voltage conditions in the circuit and controls the switching arrangement accordingly. In some examples, the apparatus also comprises a controller which controls switching of the switching arrangement by the control arrangement. The controller may, for example, determine a power supplied to the circuit and control the switching arrangement based on such determinations of the power supplied to the circuit. Further features and of example apparatus for an aerosol generating device will become apparent from the following description. An example of an aerosol generating device will now be described in detail.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the cap 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port. In some examples the socket 114 may be used additionally or alternatively to transfer data between the device 100 and another device, such as a computing device.

Figure 2:
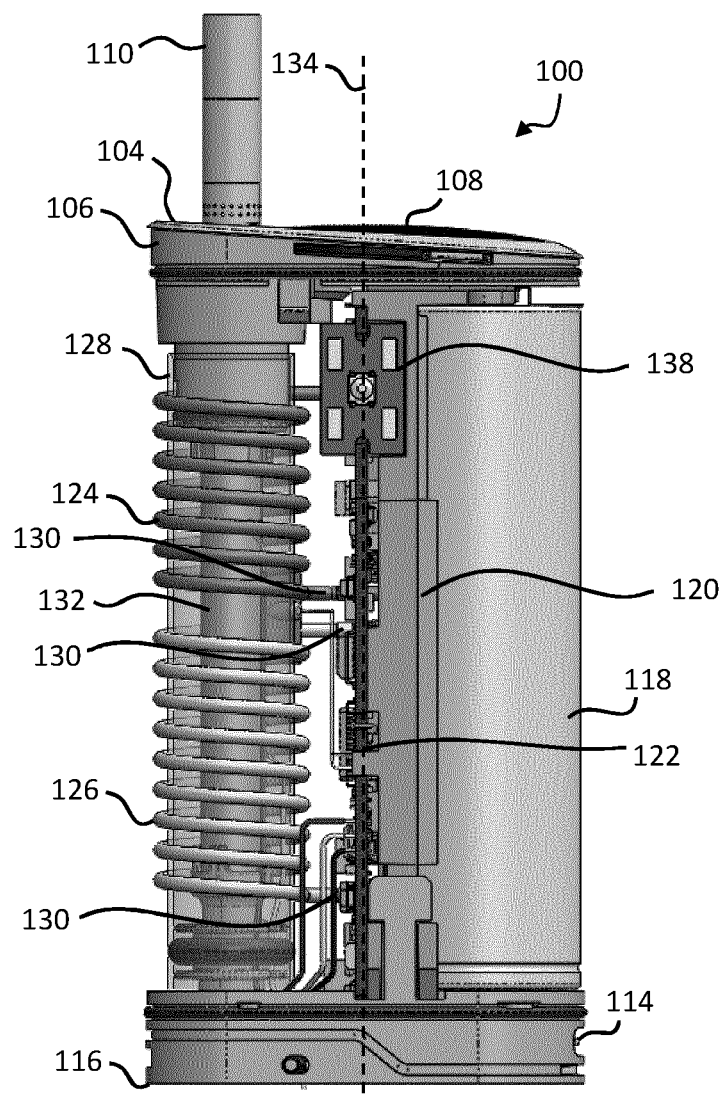
FIG. 2 shows a front view of the aerosol generating device of FIG. 1 with an outer cover removed.

FIG. 2 depicts the device 100 of FIG. 1 with the outer cover 102 removed. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100. FIG. 2 also shows a second printed circuit board 138 associated within the control element 112.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a substantially circular cross section. In other examples the Litz wire can have other shape cross sections, such as rectangular.

The first inductor coil 124 is configured to generate a first varying magnetic field for heating a first section of the susceptor 132 and the second inductor coil 126 is configured to generate a second varying magnetic field for heating a second section of the susceptor 132. Herein, the first section of the susceptor 132 is referred to as the first susceptor zone 132a and the second section of the susceptor 132 is referred to as the second susceptor zone 132b. In this example, the first inductor coil 124 is adjacent to the second inductor coil 126 in a direction along the longitudinal axis 134 of the device 100 (that is, the first and second inductor coils 124, 126 to not overlap). In this example the susceptor arrangement 132 comprises a single susceptor comprising two zones, however in other examples the susceptor arrangement 132 may comprise two or more separate susceptors. In some examples, there may be more than two heating zones. Each zone may be formed by respective parts of a single susceptor of the susceptor arrangement or by separate susceptors of the susceptor arrangement. Ends 130 of the first and second inductor coils 124, 126 are connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the inductor coils 124 126 are wound in the same direction as one another. That is, both the first inductor coil 124, and the second inductor coil 126 are left-hand helices. In another example, both inductor coils 124, 126 may be right-hand helices. In yet another example (not shown), the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In one example where the coils 124, 126 are wound in different directions (not shown) the first inductor coil 124 may be a right-hand helix and the second inductor coil 126 may be a left-hand helix. In another such embodiment, the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 132 is tubular, with a circular cross section.

The device 100 of FIG. 2 further comprises an insulating member 128 which may be generally tubular and at least partially surround the susceptor 132. The insulating member 128 may be constructed from any insulating material, such as a plastics material for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
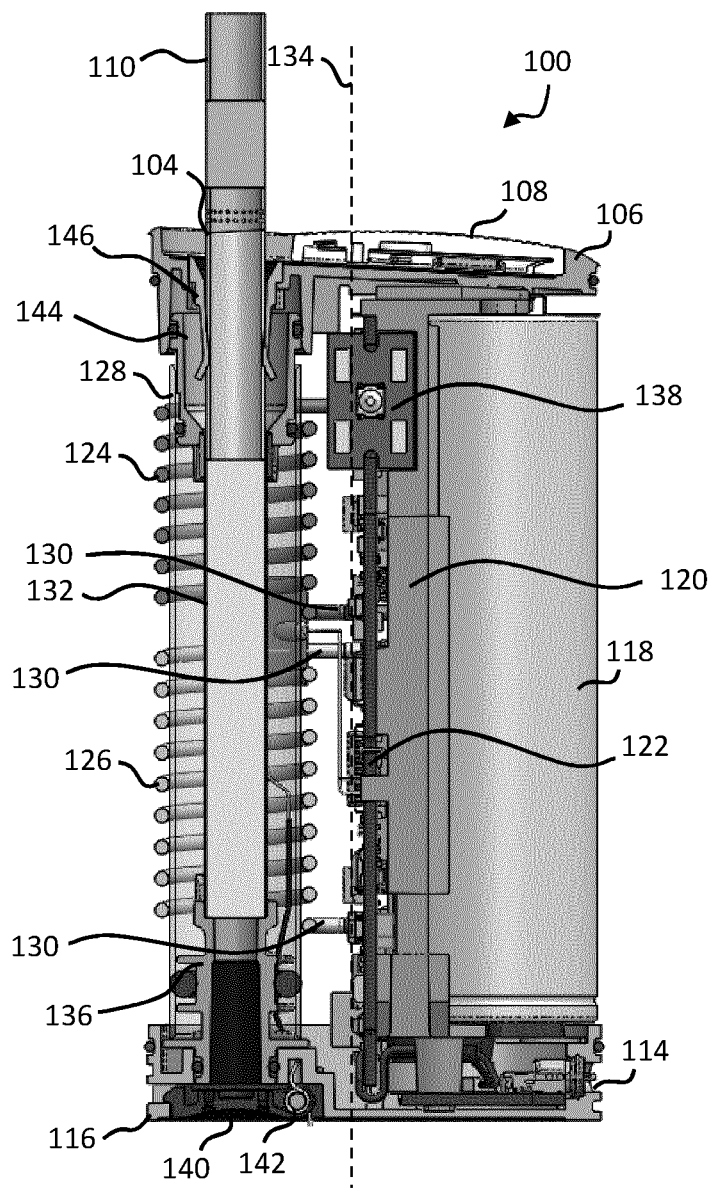
FIG. 3 shows a cross-sectional view of the aerosol generating device of FIG. 1.

FIG. 3 shows a side view of device 100 in partial cross-section. The outer cover 102 is again not present in this example. The circular cross-sectional shape of the first and second inductor coils 124, 126 is more clearly visible in FIG. 3.

The device 100 further comprises a support 136 which engages one end of the susceptor 132 to hold the susceptor 132 in place. The support 136 is connected to the second end member 116.

The device 100 further comprises a second lid/cap 140 and a spring 142, arranged towards the distal end of the device 100. The spring 142 allows the second lid 140 to be opened, to provide access to the susceptor 132. A user may, for example, open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
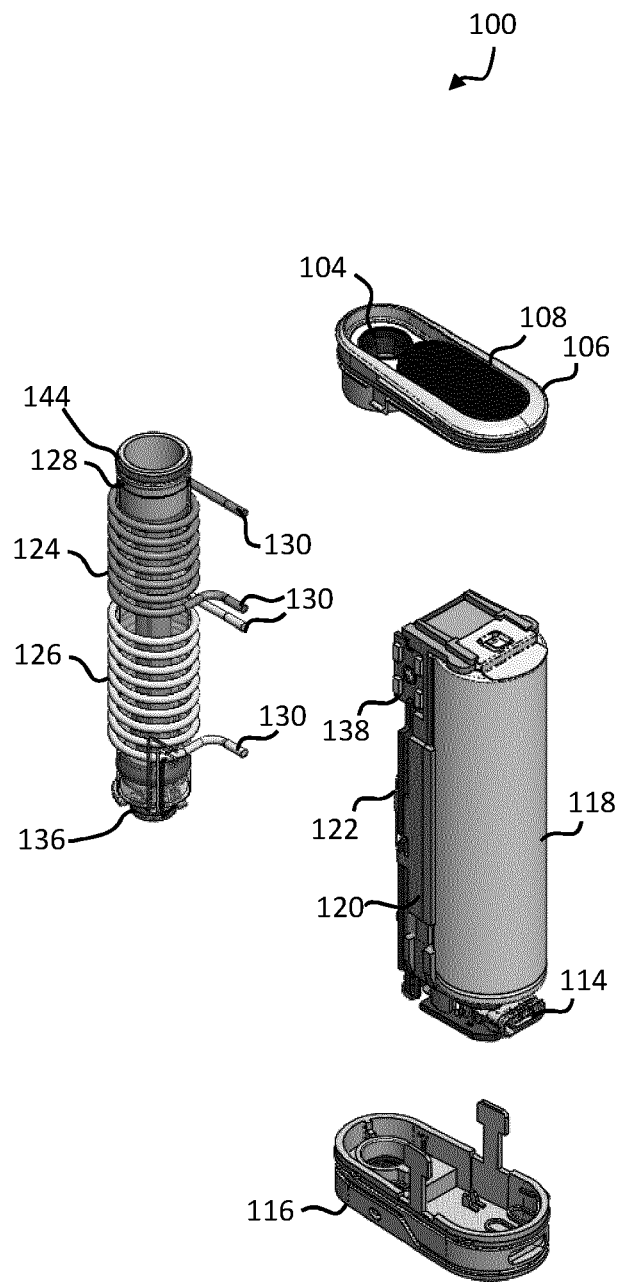
FIG. 4 shows an exploded view of the aerosol generating device of FIG. 2.

FIG. 4 is an exploded view of the device 100 of FIG. 1, with the outer cover 102 again omitted.

Figures 5A, 5B:
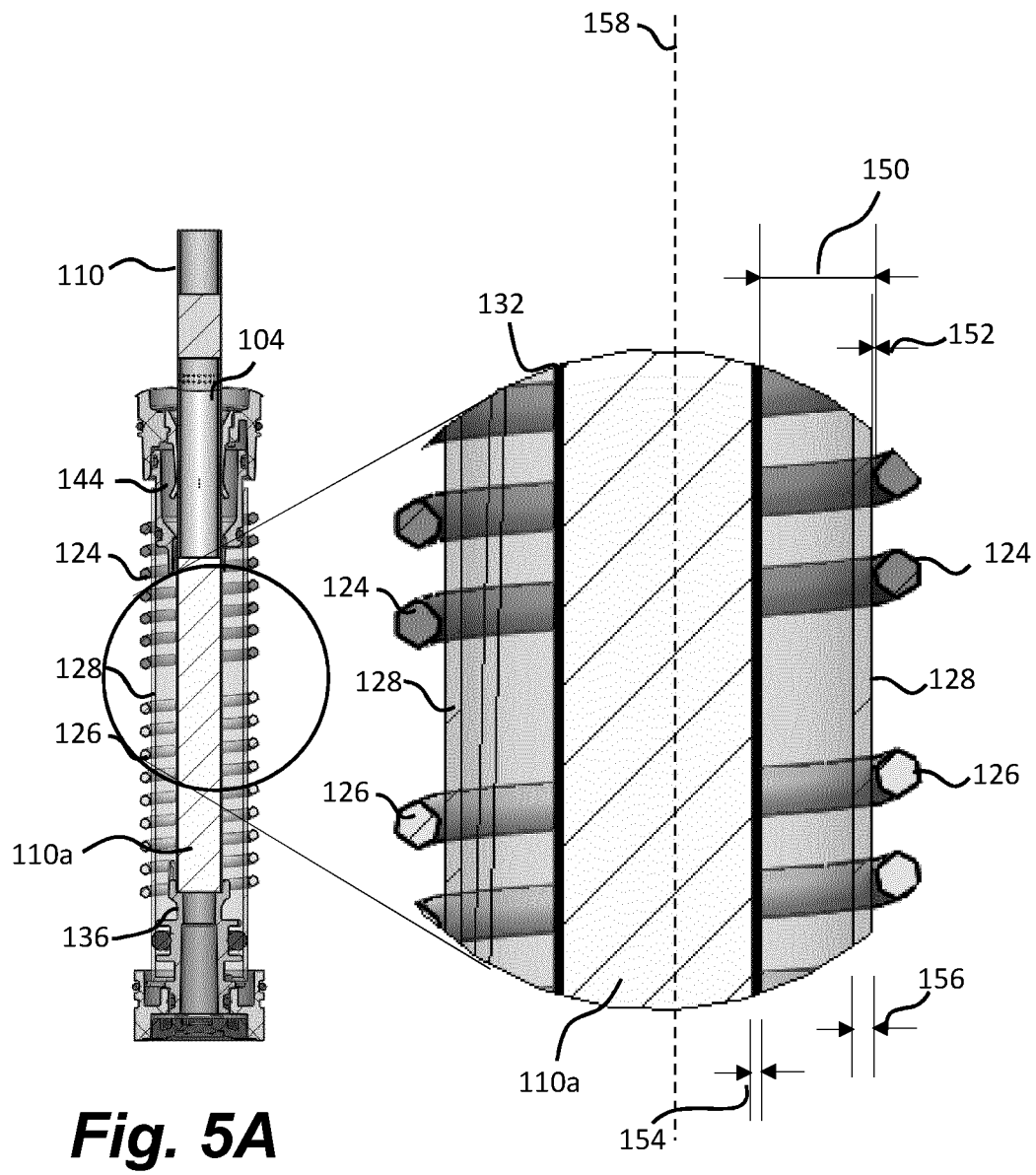
FIG. 5A shows a cross-sectional view of a heating assembly within the aerosol generating device of FIG. 1.
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110a. The aerosol generating material 110a is positioned within the susceptor 132. The article 110 may also comprise other components such as a filter, wrapping materials and/or a cooling structure.

FIG. 5B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3 mm to 3.5 mm, or about 3.25 mm.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, 0.25 mm to 1 mm, or about 0.5 mm.

As has been described above, the heating assembly of the example device 100 is an inductive heating assembly comprising various components to heat the aerosol generating material of article 110 via an induction heating process. In particular, the first inductor coil 124 and the second inductor coil 126 are used to heat respective first 132a and second 132b zones of the susceptor 132 in order to heat the aerosol generating material and generate an aerosol. Below, with reference to FIGS. 6 to 12, the operation of the device 100 in using the first and second inductor coils 124, 126 to inductively heat the susceptor arrangement 132 will be described in detail.

The inductive heating assembly of the device 100 comprises an LC circuit. An LC circuit, has an inductance L provided by an induction element, and a capacitance C provided by a capacitor. In the device 100, the inductance L is provided by the first and second inductor coils 124, 126 and the capacitance C is provided by a plurality of capacitors as will be discussed below. An induction heater circuit comprising an inductance L and a capacitance C may in some cases be represented as an RLC circuit, comprising a resistance R provided by a resistor. In some cases, resistance is provided by the ohmic resistance of parts of the circuit connecting the inductor and the capacitor, and hence the circuit need not necessarily include a resistor as such. Such circuits may exhibit electrical resonance, which occurs at a particular resonant frequency when the imaginary parts of impedances or admittances of circuit elements cancel each other.

One example of an LC circuit is a series circuit where the inductor and capacitor are connected in series. Another example of an LC circuit is a parallel LC circuit where the inductor and capacitor are connected in parallel. Resonance occurs in an LC circuit because the collapsing magnetic field of the inductor generates an electric current in its windings that charges the capacitor, while the discharging capacitor provides an electric current that builds the magnetic field in the inductor. When a parallel LC circuit is driven at the resonant frequency, the dynamic impedance of the circuit is at maximum (as the reactance of the inductor equals the reactance of the capacitor), and circuit current is at a minimum. However, for a parallel LC circuit, the parallel inductor and capacitor loop acts as a current multiplier (effectively multiplying the current within the loop and thus the current passing through the inductor). Allowing the RLC or LC circuit to operate at the resonant frequency for at least some of the time while the circuit is in operation to heat the susceptor may therefore provide for effective and/or efficient inductive heating by providing for the greatest value of the magnetic field penetrating the susceptor.

The LC circuit used by the device 100 to heat the susceptor 132 may make use of one or more transistors acting as a switching arrangement as will be described below. A transistor is a semiconductor device for switching electronic signals. A transistor typically comprises at least three terminals for connection to an electronic circuit. A field effect transistor (FET) is a transistor in which the effect of an applied electric field may be used to vary the effective conductance of the transistor. The field effect transistor may comprise a body, a source terminal S, a drain terminal D, and a gate terminal G. The field effect transistor comprises an active channel comprising a semiconductor through which charge carriers, electrons or holes, may flow between the source S and the drain D. The conductivity of the channel, i.e. the conductivity between the drain D and the source S terminals, is a function of the potential difference between the gate G and source S terminals, for example generated by a potential applied to the gate terminal G. In enhancement mode FETs, the FET may be OFF (i.e. substantially prevent current from passing therethrough) when there is substantially zero gate G to source S voltage, and may be turned ON (i.e. substantially allow current to pass therethrough) when there is a substantially non-zero gate G—source S voltage.

One type of transistor which may be used in circuitry of the device 100 is an n-channel (or n-type) field effect transistor (n-FET). An n-FET is a field effect transistor whose channel comprises an n-type semiconductor, where electrons are the majority carriers and holes are the minority carriers. For example, n-type semiconductors may comprise an intrinsic semiconductor (such as silicon for example) doped with donor impurities (such as phosphorus for example). In n-channel FETs, the drain terminal D is placed at a higher potential than the source terminal S (i.e. there is a positive drain-source voltage, or in other words a negative source-drain voltage). In order to turn an n-channel FET "on" (i.e. to allow current to pass therethrough), a switching potential is applied to the gate terminal G that is higher than the potential at the source terminal S.

Another type of transistor which may be used in the device 100 is a p-channel (or p-type) field effect transistor (p-FET). A p-FET is a field effect transistor whose channel comprises a p-type semiconductor, where holes are the majority carriers and electrons are the minority carriers. For example, p-type semiconductors may comprise an intrinsic semiconductor (such as silicon for example) doped with acceptor impurities (such as boron for example). In p-channel FETs, the source terminal S is placed at a higher potential than the drain terminal D (i.e. there is a negative drain-source voltage, or in other words a positive source-drain voltage). In order to turn a p-channel FET "on" (i.e. to allow current to pass therethrough), a switching potential is applied to the gate terminal G that is lower than the potential at the source terminal S (and which may for example be higher than the potential at the drain terminal D).

In examples, one or more of the FETs used in the device 100 may be a metal-oxide-semiconductor field effect transistor (MOSFET). A MOSFET is a field effect transistor whose gate terminal G is electrically insulated from the semiconductor channel by an insulating layer. In some examples, the gate terminal G may be metal, and the insulating layer may be an oxide (such as silicon dioxide for example), hence "metal-oxide-semiconductor". However, in other examples, the gate may be made from other materials than metal, such as polysilicon, and/or the insulating layer may be made from other materials than oxide, such as other dielectric materials. Such devices are nonetheless typically referred to as metal-oxide-semiconductor field effect transistors (MOSFETs), and it is to be understood that as used herein the term metal-oxide-semiconductor field effect transistors or MOSFETs is to be interpreted as including such devices.

A MOSFET may be an n-channel (or n-type) MOSFET where the semiconductor is n-type. The n-channel MOSFET (n-MOSFET) may be operated in the same way as described above for the n-channel FET. As another example, a MOSFET may be a p-channel (or p-type) MOSFET, where the semiconductor is p-type. The p-channel MOSFET (p-MOSFET) may be operated in the same way as described above for the p-channel FET. An n-MOSFET typically has a lower source-drain resistance than that of a p-MOSFET. Hence in an "on" state (i.e. where current is passing therethrough), n-MOSFETs generate less heat as compared to p-MOSFETs, and hence may waste less energy in operation than p-MOSFETs. Further, n-MOSFETs typically have shorter switching times (i.e. a characteristic response time from changing the switching potential provided to the gate terminal G to the MOSFET changing whether or not current passes therethrough) as compared to p-MOSFETs. This can allow for higher switching rates and improved switching control.

Figure 6:
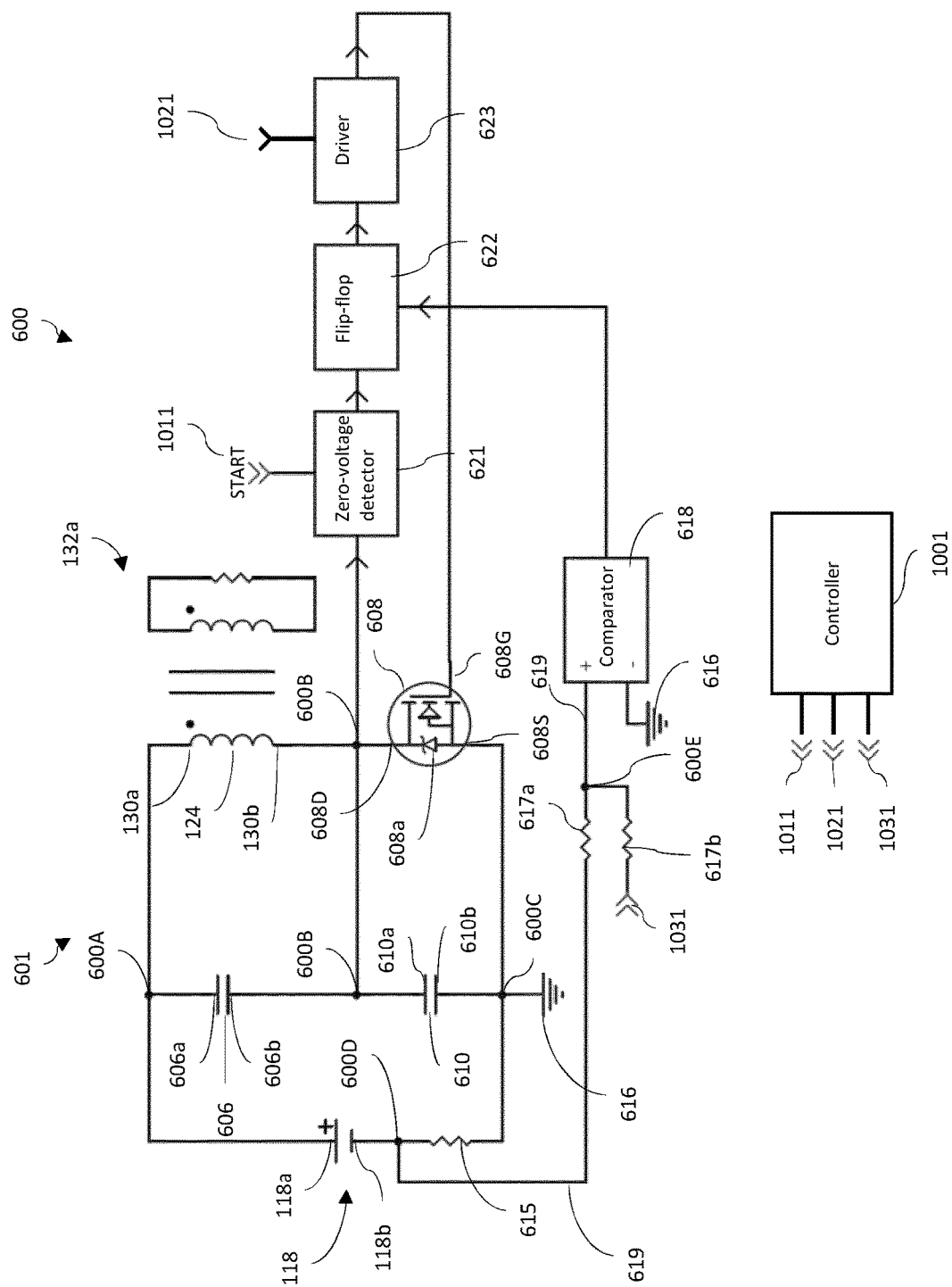
FIG. 6 shows a schematic representation of an example induction heating circuit for the aerosol generating device of FIGS. 1 to 5B.

Now with reference to FIG. 6, circuitry for induction heating by the device 100 will be described. FIG. 6 shows a simplified schematic representation of a part of an induction heating circuit 600 of the aerosol generating device 100. FIG. 6 shows a part of the induction heating circuit 600 which comprises the first inductor coil 124 for heating the first susceptor zone 132*a* when a varying current flows through the first inductor coil 124. The first susceptor zone 132*a* is represented in FIG. 6 as having an inductive element and a resistive element to represent how the susceptor 132 couples inductively with the first inductor 124 and is heated through the generation of eddy currents. It will be noted that the device 100 additionally comprises the second inductor coil 126, which is not shown in FIG. 6. The second inductor coil 126 is also part of the induction heating circuit 600 and is controlled to heat the second susceptor zone 132*b* as will be described below. However, for the sake of clarity, the circuit 600 will first be described with reference to those features shown in FIG. 6.

The circuit 600 comprises a first resonator section 601, the DC voltage supply 118 for supplying a DC voltage to the first resonator section 601, as well as a control arrangement for controlling the circuit 600. The first resonator section 601 comprises the first inductor 124 and a switching arrangement comprising a first FET 608, and the control arrangement is configured to switch the FET 608 between a first state and a second state in response to voltage conditions detected in the circuit 600, as will be described in more detail below, to operate the first inductor 124. The circuit 600, with the exception of the susceptor 132, is arranged on the PCB 122 of the device 100, with the inductor coil 124 being connected to the PCB 122 at a first end 130*a* and a second end 130*b*.

The first resonator section 601 comprises a first capacitor 606, and a second capacitor 610, both arranged in parallel with the first inductor 124 such that when the first resonator section 601 is allowed to resonate an alternating current flow between the first capacitor 606 and the second capacitor 610 and through the inductor 124. As mentioned above, the first FET 608, in this example an n-channel MOSFET, is arranged to operate as a switching arrangement in the first resonator section 601.

It should be noted that in other examples, the resonator section 601 may comprise only one capacitor, for example in the position of the first capacitor 606, or at the position of the second capacitor 610. In other examples, the resonator section 601 may comprise any other number of capacitors, such as three or more capacitors. For example, either or both of the first capacitor 606 and the second capacitor 610 may be replaced by two or more capacitors arranged in parallel with one another. As will be well understood, the resonator section 601 has a resonant frequency which is dependent on the inductance L and the capacitance C of the resonator section 601. The number, type and arrangement of capacitors in the resonating section 601 may be selected based on considerations of the power levels to be used in the circuit 600 and the desired frequency of operation of the circuit 600. For example, it will be understood that individual capacitors and an arrangement of said capacitors can be considered to have an equivalent series resistance (ESR) as well as a limit on the ability of said capacitors to handle current. Such features may be taken into account when determining an arrangement of capacitors to provide the capacitance in the resonator section 601. For example, depending on desired power levels and frequency of operation, there may be an advantage to providing a plurality of capacitors in parallel, to provide higher capacitance or lower ESR. In this example, the first and second capacitors 606, 610 are both ceramic COG capacitors each having a capacitance of around 100 nF. In other examples, other types of capacitor and/or capacitors with other capacitance values, e.g. capacitors with unequal capacitance values, may be used, according to the considerations outlined in this paragraph.

The first resonator section 601 is supplied a DC voltage by the DC voltage supply 118, which is, for example, as described above, a voltage supplied by a battery. As shown in FIG. 6, the DC voltage supply 118 comprises a positive terminal 118*a* and a negative terminal 118*b*. In one example, the DC voltage supply 118 supplies a DC voltage of around 4.2V to the first resonator section 601. In other examples, the DC voltage supply 118 may supply a voltage of 2 to 10V, or around 3 to 5V, for example.

A controller 1001 is configured to control operation of the circuit 600. The controller 1001 may comprise a microcontroller, e.g. a micro-processing unit (MPU), comprising a plurality of inputs and outputs. In one example, the controller 1001 is an STM32L051C8T6 model MPU. In some examples, the DC voltage supply 118 provided to the circuit 600 is provided by an output from the controller 1001 which itself receives power from a battery or other power source.

The positive terminal 118*a* of the DC voltage source 118 is electrically connected to a first node 600A. In an example, the DC voltage source 118 is connected to the node 600A via the controller 1001 which receives power from the DC voltage source 118 and supplies the voltage supplied by the DC voltage source to components of the device, including the circuit 600. The first node 600A is electrically connected to a first end 606a of the first capacitor 606 and to the first end 130a of the first inductor 124. The second end 130b of the first inductor 124 is electrically connected to a second node 600B, which in FIG. 6 is represented at two electrically equivalent points in the circuit diagram. The second node 600B is electrically connected to a drain terminal 608D of the FET 608. In this example, the second node 600B is also electrically connected to a first end 610a of the second capacitor 610. Continuing around the circuit, the source terminal 608S of the first FET 608 is electrically connected to a third node 600C. The third node 600C is electrically connected to ground 616, and in this example to a second end 610b of the second capacitor 610. The third node 600C is electrically connected via a current sense resistor 615 to a fourth node 600D, and the fourth node 600D is electrically connected to the negative terminal 118b of the DC voltage source 118, which, as with the positive terminal, in an example is supplied via the controller 1001.

It should be noted that in examples where the second capacitor 610 is not present, the third node 600C may have only three electrical connections: to the first FET source terminal 608S, to ground 616 and to the current sense resistor 615.

As mentioned above, the first FET 608 acts a switching arrangement in the first resonator section 601. The first FET 608 is configurable between a first state, i.e. an 'ON' state and a second state, i.e. an 'OFF' state. As will be well understood by those skilled in the art when an n-channel FET is in an OFF state (i.e. when the appropriate control voltage is not applied to its gate) it effectively acts as a diode. In FIG. 6, the diode functionality that the first FET 608 exhibits when in its OFF state is represented by a first diode 608a. That is, when the FET 608 is in the OFF state the first diode 608a acts to largely prevent current flowing from the drain terminal 608D to the source terminal 608S but allows current to flow from the source terminal 608S to the drain terminal 608D if the diode 608a is appropriately forward biased. An n-channel FET is in an ON state when an appropriate control voltage is applied to its gate so that a conductive path exists between its drain D and source S. As such, when the first FET 608 is in the ON state, it acts like a closed switch in the first resonator section 601.

As mentioned above, the circuit 600 may be considered to comprise a first resonator section 601 and an additional control arrangement. The control arrangement comprises a comparator 618, a zero-voltage detector 621, and a flip-flop 622, and is configured to detect voltage conditions within the first resonator section 601 and to control the first FET 608 in response to the detected voltage conditions. This control of the first FET 608 by the control arrangement will now be described in more detail.

At the second node 600B there is electrically connected the zero-voltage detector 621, which is configured to detect a voltage condition, i.e. a voltage of at or near 0V with respect to a ground voltage, at a point in the circuit 600 to which the zero-voltage detector 621 is connected. The zero-voltage detector 621 is configured to output a signal to control switching of the state of the FET 608. That is, the zero-voltage detector 621 is configured to output a signal to the flip-flop 622. The flip-flop 622 is an electrical circuit which is configurable between two stable states. The flip-flop 622 is electrically connected to a first gate driver 623 which is configured to provide a voltage to the first FET gate terminal 608G dependent on the state of the flip-flop. That is, the first gate driver 623 is configured to provide an appropriate voltage to the first FET gate terminal 608G to switch the FET 608 to the ON state when the flip-flop is in one state, but is configured not to provide a voltage appropriate for maintaining the FET 608 in the ON state when the flip-flop 622 is in the other state. For example, the first gate driver 623 may be configured to provide an appropriate gate-source voltage to the first FET gate 608G to switch the FET 608 ON when the flip-flop 622 is in a state '1', and the first gate driver 623 may be configured not to provide the gate-source voltage when the flip-flop 622 is in state '0'. The state of the flip-flop means 622 therefore controls whether the first FET 608 is on or off.

In this example, the zero-voltage detector 621 and the first gate driver 623 of the control arrangement are configured to receive respective signals 1011, 1021 from the controller 1001, by which signals the controller 1001 can initiate and control operation of the circuit 600, as will be discussed in more detail below.

At the fourth node 600D, there is electrically connected a control voltage line 619. The control voltage line 619 is electrically connected to a fifth node 600E via a resistor 617a and the fifth node 600E is electrically connected to the voltage comparator 618—hereinafter comparator 618. The fifth node 600E is electrically connected to a positive terminal of the comparator 618. A negative terminal of the comparator 618 is connected to ground 616. In this example, the comparator 618 is configured to output a signal based on a comparison of the voltage at the fifth node 600E to ground voltage. The output signal of the comparator 618 is sent to the flip-flop 622. A control voltage 1031 is supplied, in this example from the controller 1001, to the control voltage line 619 via a second resistor 617b.

As mentioned above, the comparator 618 is electrically connected to provide an output to the flip-flop 622. The flip-flop 622 is configured such that an output signal from the comparator 618 can change the state of the flip-flop 622, and thereby cause the first driver 623 to change the state of the first FET 608.

The functioning of the example circuit 600 will now be described in more detail in the context of the first resonator section 601 being activated by the controller 1001 such that the first inductor coil 124 is operated to heat the first susceptor zone 132a.

To begin, the first FET 608 is configured in the OFF state, and is thus acting as a diode 608a, preventing current flowing through the inductor 124. The controller 1001 initiates the operation of the circuit 600 to heat the first susceptor zone 132a by causing the FET 608 to switch from the OFF state to the ON state. In this example the controller initiates operation of the circuit 600 by providing a START signal 1011 to the zero-voltage detector 621. The flip-flop 622 is thereby caused to change states and cause the first gate driver 623 to provide a signal to the FET gate terminal 608G to thereby switch the FET to the ON state.

Once the FET 608 is switched to the ON state, what may be referred to as a self-oscillating heating cycle of the circuit 600 begins. The FET 608, now being in the ON state, acts as a closed switch allowing a DC current to begin flowing from the DC voltage source positive terminal 118a through the first inductor 124 and returning to the DC voltage source negative terminal 118b via the current sense resistor 615. The first inductor 124 opposes this initial increase in current, as is well-known, generating a back emf via Faraday's and Lenz's laws. In the ON state, the voltage between the drain terminal 608D and the source terminal 608S is substantially zero.

Figure 7A:
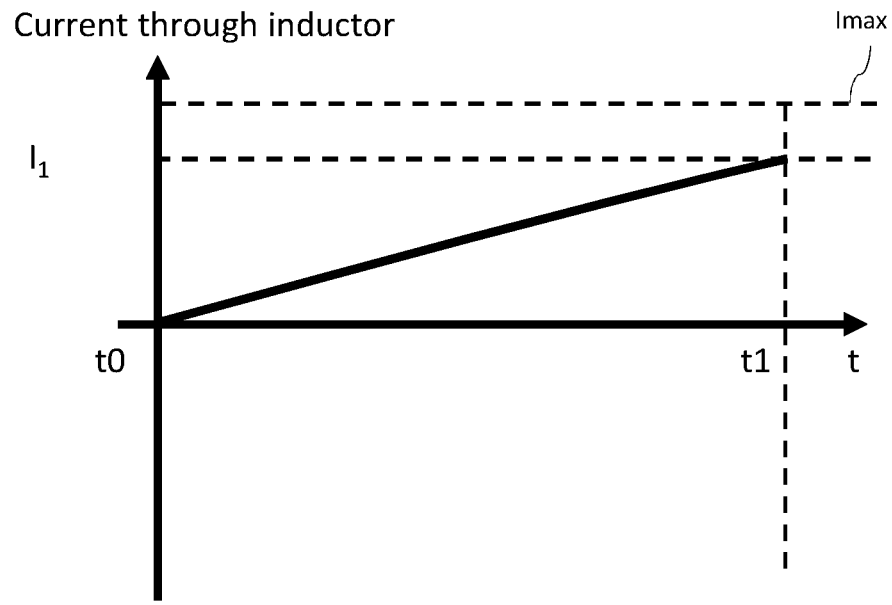
FIG. 7A shows a schematic representation of a current through an inductor of the example induction heating circuit of FIG. 6.

FIG. 7A shows a schematic graphical representation of the current flowing through the first inductor 124 against time t starting from when the FET 608 is switched on, at time $t_0$. From time $t_0$, a DC current begins to build up in the inductor 124 from zero at a rate which is dependent on an inductance L1 of the inductor 124, a DC resistance of the circuit 600 and the DC supply voltage. In one example the current sense resistor 615 has a resistance of around 2 mΩ, while the inductor 124 has a DC resistance of, 2 to 15 mΩ, or 4 to 10 mΩ or in this example around 5.2 mΩ. This build-up of current in the inductor corresponds to the inductor 124 storing magnetic energy, and the amount of magnetic energy which can be stored by the inductor 124 is dependent on its inductance L1, as will be well understood.

Figure 7B:
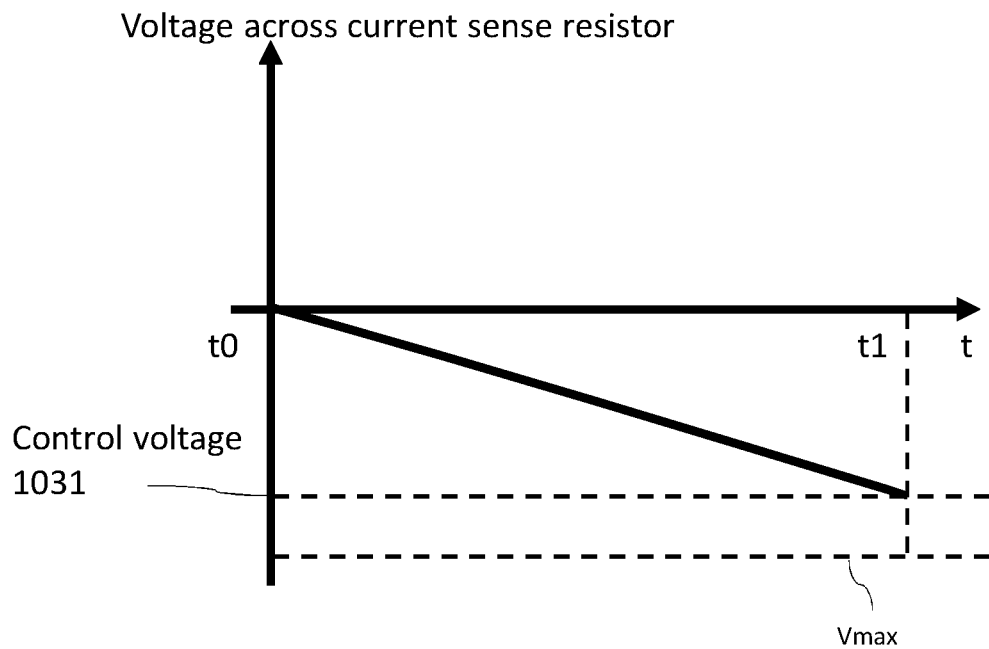
FIG. 7B shows a schematic representation of a voltage across a current sense resistor of the example induction heating circuit of FIG. 6.

FIG. 7B shows a simplified representation of the voltage across the current sense resistor 615 against time t, again from the time $t_0$ when the FET 608 is turned on. Shortly after the FET 608 is turned on, a voltage develops across the inductor 124, this being the back emf generated by the inductor 124 as the inductor opposes the increase in current. At this time, therefore, the voltage across the current sense resistor 615 as shown in FIG. 7B is small, since almost all of the voltage difference provided by the DC supply 118 drops across the inductor 124. Then, as the current through the inductor 124 increases and the back emf of the inductor 124 decays, the voltage across the current sense resistor 615 increases. This is seen as the development of a negative voltage across the current sense resistor 615, as shown in FIG. 7B. That is, the voltage across the current sense resistor 615 becomes increasingly negative with the length of time that the FET 608 is on.

Since the increasingly negative voltage across the current sense resistor 615 corresponds with the increasing current through the inductor 124, the magnitude of the voltage across the current sense resistor 615 is indicative of the current flowing through the inductor 124. While the FET 608 remains on, the current through the inductor 124 and the voltage across the current sense resistor 615 increase substantially linearly towards respective maximum values $I_{max}$, $V_{max}$ (which are dependent on the DC voltage supplied by DC supply 118 and the DC resistance of the circuit 600) with a time constant dependent on the inductance L1 and on the DC resistance of the circuit 600. It should be noted that as the current through the inductor 124 is varying after time $t_0$ some inductive heating of the susceptor 132 may occur while the DC current through the first inductor 124 builds up.

The circuit 600 is configured such that the amount of energy which is stored in the first inductor 124 in the time during which the FET 608 is switched on, is determined by the control arrangement and can be controlled by the controller 1001. That is, the controller 1001 controls an amount of DC current (and thus an amount of magnetic energy) allowed to build up in the inductor 124, as will now be described.

As described above, the control voltage 1031 is applied to the control voltage line 619. In this example, the control voltage 1031 is a positive voltage and the voltage input to the positive terminal of the comparator 618 (i.e. the voltage at the fifth node 600E) at any one time is dependent on the value of control voltage 1031 and the voltage at the fourth node 600D. When the negative voltage across the current sense resistor 615 reaches a particular value, it cancels, at the fifth node 600E, the positive control voltage 1031 and gives a voltage of 0V (i.e. ground voltage) at the fifth node 600E. In this example, the resistor 617a has a resistance of 2 kΩ. The resistor 617b represents an effective resistance to the controller 1001 of 70 kΩ. The voltage at the fifth node 600E reaches 0V when the negative voltage across the current sense resistor 615 has the same magnitude as the control voltage 1031.

The comparator 618 is configured to compare the voltage at its positive terminal to the voltage of ground 616, connected to its negative terminal, and output a signal as a result. In one example the comparator is a standard component FAN156, as may be obtained from On-Semiconductor. Accordingly, when the voltage at fifth node 600E reaches 0V, the comparator 618 receives a 0V signal at its positive terminal, and the result of the comparison by the comparator 618 is that the voltage at the positive terminal is equal to the voltage at the negative terminal. The comparator 618 consequently outputs a signal to the flip-flop 622 and causes the FET 608 to be switched off. As such, switching off of the FET 608 is dependent on a voltage condition detected in the circuit 600. Namely, in this example, when the comparator 618 detects by comparison of the voltage across its terminals that a negative voltage across the current sense resistor 615 has reached the same magnitude as the control voltage 1031, which occurs at time $t_1$, the FET 608 is switched off. In FIG. 7A, the DC current flowing through the inductor 124 at time $t_1$ when the FET 608 is switched off is labelled $I_1$.

When the FET 608 is turned off, at time $t_1$, the FET 608 switches from acting like a closed switch to acting like a diode 608a in the resonator section 601, and for the purposes of supply from the DC supply 118 effectively acting like an open switch. At time $t_1$ the path of the DC current through the inductor 124 to ground 616 is interrupted by the FET 608. This triggers the current flowing in the first inductor 124 to drop off (this is not shown in FIG. 7A), and the inductor 124 opposes this change in current by generating an induced voltage. Accordingly, current begins oscillating back and forth between the inductor 124 and the capacitors 606, 608 at the resonant frequency of the first resonator section 601.

Similarly, the voltage across the inductor 124 and thereby between the first FET drain 608D and source 608S terminals begins to oscillate at the resonant frequency of the first resonator section 601. As the current through and voltage across the inductor 124 begin to oscillate, the susceptor 132 is inductively heated. Switching the FET 608 to the OFF state, therefore acts to release the magnetic energy stored in the inductor 124 at time $t_1$ to heat the susceptor 132.

Figure 8:
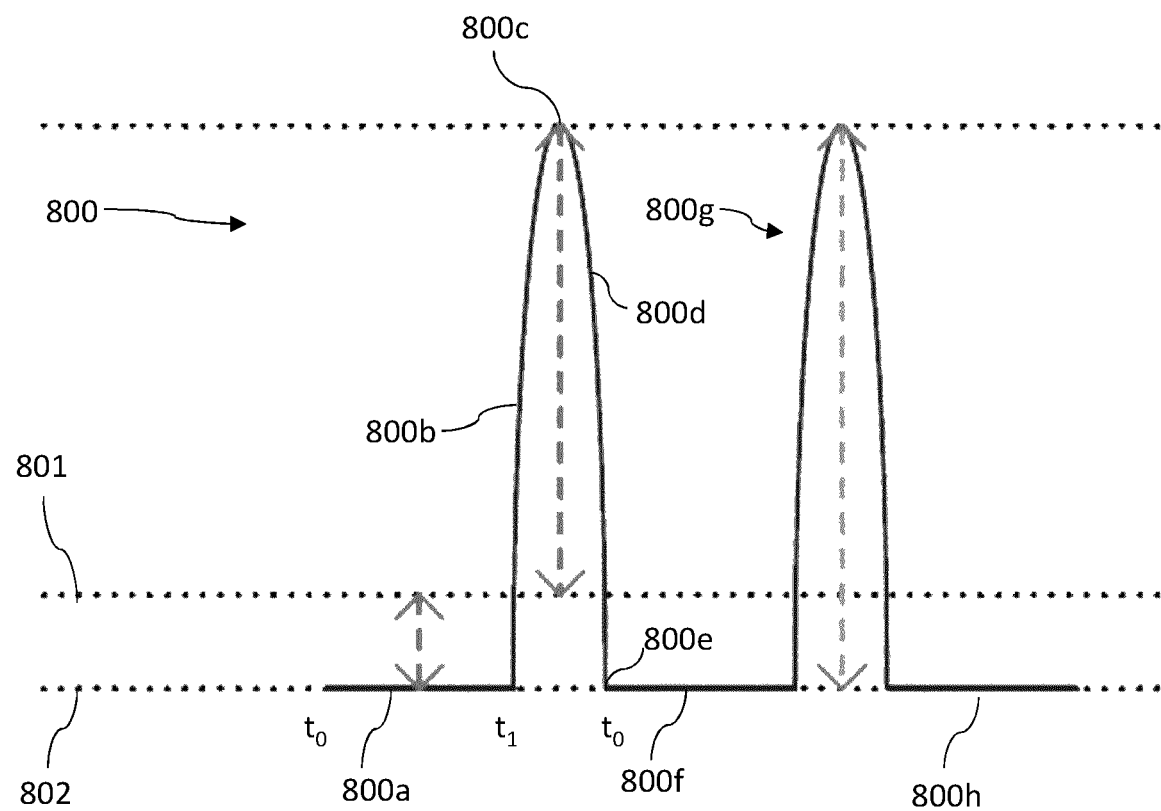
FIG. 8 shows a schematic representation of a voltage across a switching arrangement of the circuit of FIG. 6.

FIG. 8 shows a trace 800 of the voltage across the first FET 608, starting from the FET 608 being in the ON state from time $t_0$ to $t_1$. Over the time illustrated in FIG. 8 the first FET 608 is turned off and on twice.

The voltage trace 800 comprises a first section 800a between times $t_0$ and $t_1$ when the first FET 608 is ON, and a second section 800b to 800d when the first FET 608 is switched off. At 800e the FET 608 is switched on again, and a third section 800f which is equivalent to the first section 800a begins while the first FET 608 remains on and the above-described process of building up of DC current through the inductor 124 repeats. FIG. 8 also shows a fourth section 800g when the first FET 608 is switched off again to allow oscillation of the voltage across the FET 608, and a fifth section 800h when the first FET 608 is subsequently switched on again.

The voltage across the first FET 608 is zero when the first FET 608 is on in sections 800a, 800f and 800h. When the first FET 608 is turned off as indicated by section 800b to

800d and also by section 800g, the first inductor 124 uses the energy stored in its magnetic field (which magnetic field was the result of the DC current built up when the first FET 608 was on) to induce a voltage that opposes a drop in the current flowing through the first inductor 124 as a result of the first FET 608 being off. The voltage induced in the first inductor 124 causes a corresponding variation in voltage across the first FET 608. During this variation in voltage, the first inductor 124 and the capacitors 606, 610 begin to resonate with each other with a sinusoidal waveform. The voltage shown by voltage trace 800 initially increases (see for example 800b) as the induced voltage in the first inductor 124 increases to oppose a drop in current due to the first FET 608 being off, reaches a peak (see for example 800c) and then, as the energy stored in the magnetic field of the first inductor 124 diminishes, decreases back to zero (see for example 800d).

The varying voltage 800b to 800d and 800g produces a corresponding varying current (not shown) and, since during the off time of the first FET 608, the capacitors 606, 610 and the first inductor 124 act as a resonant LC circuit, the total impedance of the combination of the first inductor 124 and capacitors 606, 610 is at a minimum during this time. It will therefore be understood that the maximum magnitude of the varying current flowing through the first inductor 124 will be relatively large. This relatively large varying current accordingly causes a relatively large varying magnetic field in the first inductor 124 which causes the susceptor 132 to generate heat. The time period over which the voltage across the first FET 608 varies as indicated by section 800b to 800d and by section 800g in this example depends on the resonant frequency of the first resonator section 601.

Referring now to FIG. 6 and FIG. 8, the circuit 600 is configured such that when the first FET 608 is off and the voltage across the first FET 608 decreases back towards 0V, the zero-voltage detector 621 detects this voltage condition and outputs a signal to the flip-flop 622 which causes the first FET 608 to be switched back to the ON state. That is, in response to this voltage condition detected within the first resonator section 601, the FET 608 is switched from the OFF state to the ON state. The zero-voltage detector 621 may be considered to detect a voltage condition indicative that a given proportion of a cycle of current oscillation between the inductive element and the capacitive element has been completed since the FET 608 was switched off. That is, the zero-voltage detector 621 detects that a half-cycle of current (and voltage) oscillation at the resonant frequency of the first resonator section 601 has been completed by the zero-voltage detector 621 detecting that the voltage across the FET 608 has returned to 0V or nearly 0V.

In some examples, the zero-voltage detector 621 may detect when the voltage across the first FET 608 has returned to at or below a voltage level 801 and as such may output a signal to cause switching of the state of the FET 608 before the voltage across the FET 608 reaches exactly 0V. As is illustrated by FIG. 8, the operation of the zero-voltage detector 621 curtails oscillations of the voltage in the resonator section 601 after one half-cycle and thus results in a substantially half-sine wave voltage profile across the first FET 608. Further details of the operation of the zero-voltage detector 621 will be described below with reference to FIG. 9.

When the first FET 608 is switched back on, at point 800e, a DC current driven by the DC source 118 again builds up through the first inductor 124. The first inductor 124 may then again store energy in the form of a magnetic field to be released when the first FET 608 is next switched off to initiate resonance within the first resonator section 601. As the first FET 608 is repeatedly switched on and off in this way, the above described process is continuously repeated to heat the susceptor 132.

It should be noted that the above described building up of current through the inductor 124 described with reference to FIGS. 7A and 7B occurs both when the FET 608 is turned on initially in response to a START signal 1011 from the controller 1001 and when the FET 608 is switched on subsequently by a zero-voltage condition detected by the zero-voltage detector 621. In the first instance, in response to the START signal 1011, the current in the inductor 124 builds up substantially linearly from 0. In the second instance, when the FET 608 is turned back on in response to a detected zero voltage condition at point 800e, some excess current is circulating in the circuit 600 (e.g. from previous cycles of switching on and off of the FET 608). As the FET 608 is turned back on following the detection of a zero-voltage condition, the recirculating current produces an initial negative current through the FET 608. Then, while the FET 608 remains on, the current through the FET 608 and inductor 124 builds up, substantially linearly, from the initial negative current value produced by the recirculating current. As the current through the inductor 124 builds up, the voltage across the current sense resistor 615 correspondingly becomes increasingly negative, in the manner described above.

In examples, switching on and off of the FET 608 may occur at a frequency of around 100 kHz to 2 MHz, or around 500 kHz to 1 MHz, or around 300 kHz. The frequency at which the switching on and off of the FET 608 occurs is dependent upon the inductance L, the capacitance C, the DC supply voltage supplied by the supply 618 and further upon a degree to which current continues recirculating through the resonator section 601 and the loading effect of the susceptor 132. For example, where the DC supply voltage equals 3.6V, the inductance of the inductor 124 is 140 nH, and the capacitance of the resonator section 601 is 100 nF, the time for which the FET 608 remains on may be around 2700 ns and the time for a half-cycle of oscillation to complete when the FET 608 is off may be around 675 ns. These values correspond to a power of around 20 W being supplied from the DC voltage supply 118 to the resonator section 601. The above value of the time for which the FET 608 remains on is affected by the amount of current which recirculates in the circuit, since as described above, this recirculating current causes an initial negative current through the inductor upon switching on of the FET 608. It should also be noted that the time for the current to build up to the value which causes switching off of the FET 608 is also at least in part dependent on the resistance of the inductor 124, however, this has a relatively minor effect on the time when compared to the effect of the inductance of the resonator section 601. The time for a half-cycle of oscillation to complete (of in this example 675 ns) is dependent on the resonant frequency of the resonator section 601 which is affected not only by the values of inductance and capacitance of the inductor 124 and capacitors 606, 610 respectively, but also by the effective resistance provided by loading the inductor 124 with the susceptor 132.

Thus far, the circuit 600 has been described in terms of its operation to heat the susceptor 132 by one inductor, the first inductor 124, and thus only a part of the circuit 600 used by the device 100 has been described. However, as described above, the device 100 also comprises a second inductor 126 for heating the second zone 132b of the susceptor 132. FIG.

9 shows a simplified schematic of the circuit 600 comprising the second inductor 126 in addition to the first inductor 124.

Figure 9:
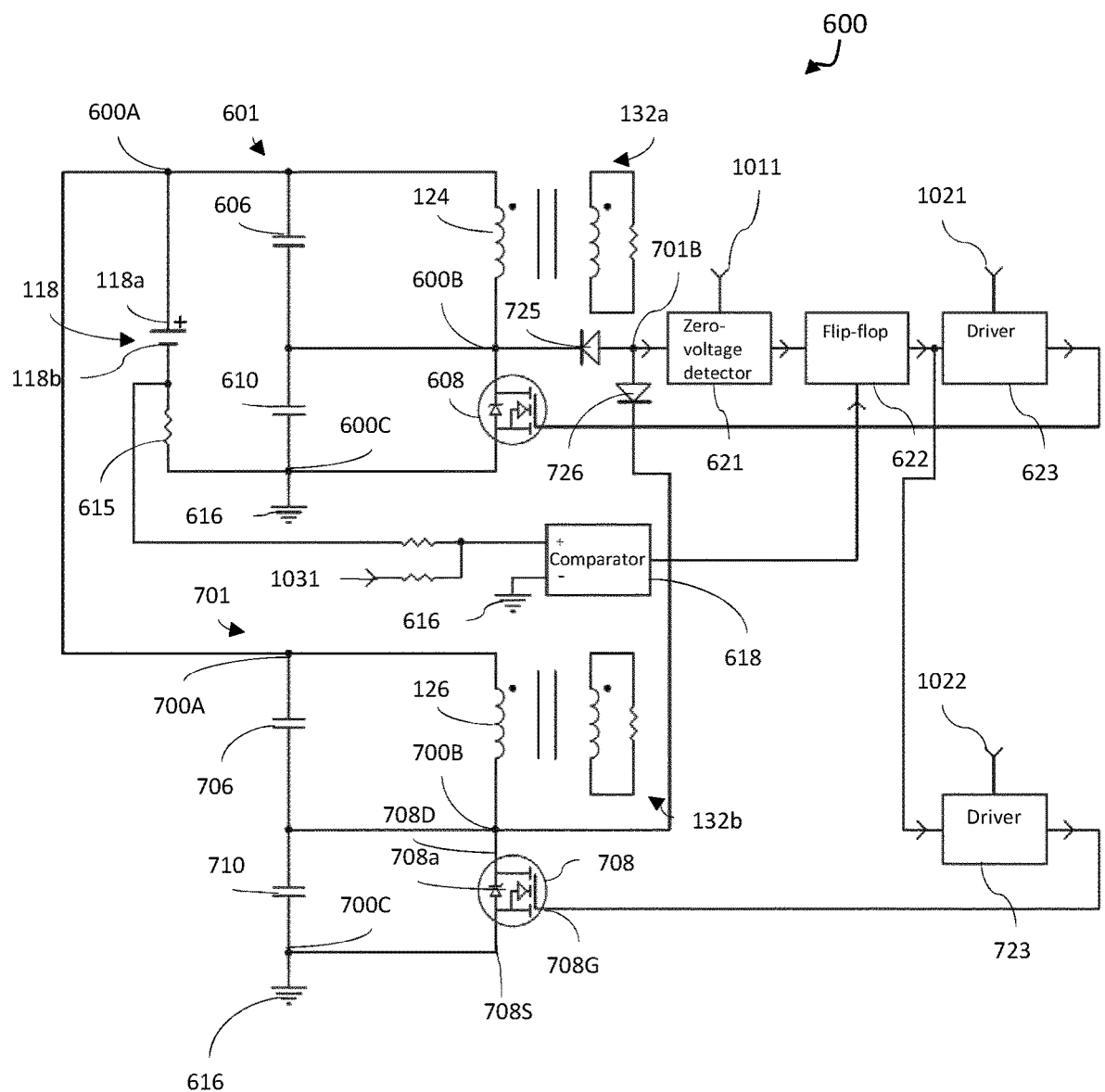
FIG. 9 shows another schematic representation of the example induction heating circuit for the device of FIGS. 1 to 5B.

As shown in FIG. 9, in addition to the features described with reference to FIGS. 6 to 8, the circuit 600 comprises a second resonator section 701 comprising the second inductor coil 126, a third capacitor 706, a fourth capacitor 710 and a second FET 708, having a drain terminal 708D, a source terminal 708S, and a gate terminal 708G. Additionally, the circuit 600 comprises a second gate driver 723 configured to provide a gate-source voltage to the second FET gate terminal 708G. The controller 1001 is not shown in FIG. 9 but the controller 1001 controls the circuit 600 in the manner described with reference to FIGS. 6 to 8 and additionally is configured to provide a control signal 1012 to the second gate driver 723. Some reference numerals of features of the circuit 600 already described with reference to FIG. 6 have been omitted from FIG. 9 for the sake of clarity.

As described above, the first inductor 124 is arranged to heat the first zone 132a of the susceptor 132 and the second inductor 126 is arranged to heat the second zone 132b of the susceptor 132. The second inductor 126, third and fourth capacitors 706, 710, and second FET 708 are arranged to form the second resonator section 701, in the same manner as the first inductor 124, first and second capacitors 606, 610, and first FET 608 are arranged to form the first resonator section 601. In one example, the third and fourth capacitors 706, 710 are also COG capacitors and may have a capacitance of around 100 nF. The second inductor 126 in one example has a DC resistance of around 8 mΩ. When active, the second resonator section 701 operates to heat the susceptor 132 in an equivalent manner as described above for the first resonator section 601 and description of this will not be repeated here.

It will be appreciated that the value of the DC resistance of the inductors 124, 126 will have an effect on the efficiency of the circuit 600, since a higher DC resistance will result in higher resistive losses in the inductor 124, 126 and as such it may be desirable to minimize inductor DC resistance, for example by changing the number of windings, or the cross-section of the inductors 124, 126. Furthermore, it will be appreciated that an AC resistance of the inductor 124 is increased compared to the DC resistance due to the skin effect. As such, the use of Litz wire in examples provides for reducing the skin effect, and thereby reducing AC resistance and associated resistive losses from the inductors 124, 126. To give an example, where the first inductor 124 has a DC resistance of around 5 mΩ and the second inductor 126 has a DC resistance of around 8 mΩ, and the circuit operates at around 300 kHz, the particular arrangement of Litz wire forming the coils results in effective resistances for the inductors 124, 126 of around 1.14 times their DC resistance values.

A node 700A in the second resonator section 701 is equivalent to the first node 600A of the first resonator section 601 and is electrically connected to the first node 600A and thereby to the positive terminal 118a of the DC supply 118. A node 700C is at the equivalent position in the second resonator section 701 as is the third node 600C of the first resonator section 601 and the node 700C is similarly connected to ground 616.

It is important to note that the circuit 600 is configured to be operated by the controller 1001 such that only one of the resonator sections 601, 701 is active at any one time. Examples of this operation will be described in more detail below.

During the activation of one of the resonator sections 601, 701, the zero-voltage detector 621 is configured to detect a zero-voltage condition in the active resonator section 601, 701 and thus control switching of the respective FET 608, 708 of the active resonator section 601, 701. The zero-voltage detector 621 controls when the respective FET 608, 708 of the active resonator section 601, 701, is switched back on (such as at point 800e), and example of this will now be described in more detail, with reference to FIGS. 8 to 10.

In the circuit 600, the zero-voltage detector 621 is configured to detect a zero-voltage condition at the second node 600B of the first resonator section 601 or at the equivalent node 700B of the second resonator section 701. When one of the first resonator section 601 and second resonator section 701 is active, the zero-voltage detector 621 detects each time the respective FET 608, 708 has been switched off, that the voltage across that FET 608, 708 has returned to zero (e.g. point 800e in FIG. 8) or, is close to zero e.g. below a level 801. In response to the zero-voltage detector 621 making this detection, a signal is output to change the state of the flip-flop 622. The respective gate driver 623 which is in operation then outputs a gate-source voltage to switch the respective FET back to the ON state.

A first small signal diode 725 connects the zero-voltage detector 621 to the first resonator section second node 600B and a second small signal diode 726 connects the zero-voltage detector 621 to the equivalent node 700B of the second resonator section 701. Specifically, anodes of the first small signal diode 725 and second small signal diodes are connected to the zero-voltage detector 621 input via a common node 701B while cathodes of the diodes 725, 726 are connected respectively to the nodes 600B, 700B.

Figure 10:
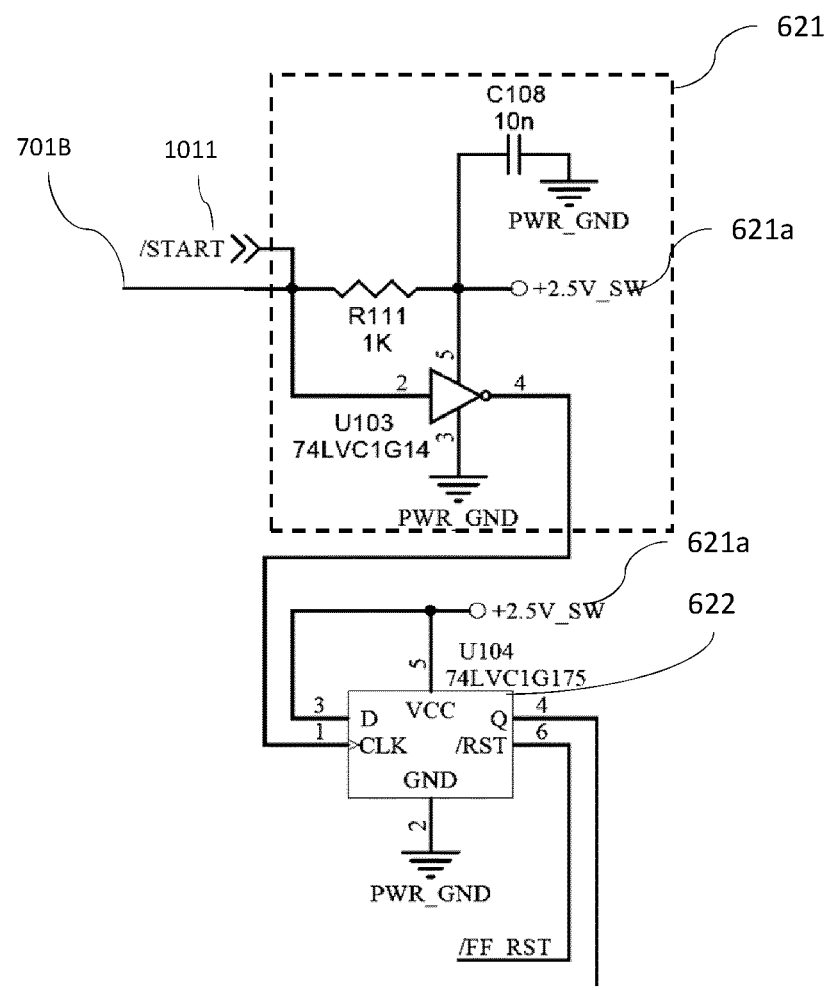
FIGS. 10, 11, 12, and 13 show various parts of an example control arrangement for an example induction heating circuit.

The operation of the zero-voltage detector 621, in a particular example, will now be described with reference to FIG. 10, which shows the zero-voltage detector 621 and the flip-flop 622. In FIG. 10, the components which make up the zero-voltage detector 621 are enclosed by a dotted line box. The node 701B connected to the anodes of the first and second small signal diodes 725, 726 is shown. The start signal 1011 from the controller 1001 to the zero-voltage detector 621 can also be seen in FIG. 13.

The zero-voltage detector 621 in this example comprises an inverter gate U103 having an input 2 from the node 701B and an output 4 connected to an input of the flip-flop 622. The inverter gate U103 is powered by connections 5 and 3 and a capacitor C108 isolates the connection 5 from ground. A logic power supply 621a of, in this example, 2.5V is applied to the input 5 and via a pull-up resistor R111 to the input 2 of the inverter gate U103. The logic power supply 621a is in this example supplied from the controller 1001. The inverter gate U103 is configured to act as an OR gate for the START signal 1011 and a zero-voltage detection signal from the node 701B. That is, the inverter gate U103 is configured to receive a logic low signal in the form of the START signal 1011 from the controller 1001 to initiate operation of the circuit 600a. The START signal 1011 may be provided by on "open drain" signal pin of the controller 1001. The inverter gate U103 is also configured to receive a logic low signal from the node 701B when one of the first and second signal diodes 725, 726 is forward biased due to one of the nodes 600B, 700B being at or near zero volts, as will be explained below. When either or both of these logic low signals is received by the inverter gate input 2 the inverter gate U103 inverts the received signal and outputs a logic-high signal to the flip-flop 622.

When the first inductor 124 is being operated to heat the susceptor 132, the second FET 708 remains off. When the second FET 708 remains off, the second small signal diode 726 has either no bias or is reverse biased depending on the voltages at the logic power source and the DC supply 118, that is, the voltage at a cathode end (nearest the node 700B) of the second small signal diode 726 is either substantially the same as or higher than the voltage at an anode end (nearest the zero-voltage detector 621) of the second small signal diode 726.

During operation of the first resonator section 601, when the first FET 608 is off and the voltage across it varies as indicated by 800b-d of FIG. 8, the first small signal diode 725 is reverse biased. At the end of this variation in voltage, when the voltage reaches 0V as indicated by 800e, or is close to 0V (e.g. at or below level 801), the first small signal diode 725 becomes forward biased. Accordingly, when the first small signal diode 725 is forward biased at 800e, the signal provided to the input 2 of the inverter gate U103 becomes a logic low signal since a voltage drop is produced from the logic signal 621a across the resistor R111. As such, once this logic low signal is inverted by the inverter gate U103, a logic high signal is provided at the output 4 of the inverter gate U103.

Although in the above description the functioning of the zero-voltage detector 621 is described in relation to controlling switching of the first FET 608, it will be understood that the zero-voltage detector 621 functions in the same way, using the second small signal diode 726 instead of the first small signal diode 725, to control the second FET 708.

Still with reference to FIG. 10, the flip-flop 622 comprises a clock input CLK, a reset input/RST, and an output Q. The flip-flop 622 also comprises further inputs D and VCC for supplying power, in this example the flip-flop receives the same 2.5V logic power supply 621a from the controller 1001 as the inverter gate U103 receives. The clock input CLK is connected to the output 4 of the inverter gate U103 and is configured to receive a signal therefrom. When the output 4 of the inverter gate U103 switches from logic-low to logic-high (due to the input 2 of inverter gate U103 receiving a detected zero-voltage condition or a START signal 1011 as described above) the clock input CLK of the flip-flop 622 receives a logic-high rising edge signal which "clocks" the flip-flop 622 and makes the state of the flip-flop output Q high. The flip-flop 622 comprises a further input/RST configured to receive a signal from the output of the comparator 618, by which the comparator 618 can change the state of the flip-flop 621 to cause the flip-flop output Q to be low. The flip-flop output Q is connected to the first and second gate drivers 623, 723 and on receiving a high output from the flip-flop output Q, whichever one of the gate drivers 623, 723 is active (due to receiving a signal 1021, 1022 as described above) provides a gate driver signal to its respective FET 608, 708.

In one particular example, the flip-flop 622 may switch at half of the voltage of the logic power source 621a, that is, at 1.25V in this example. This means that the forward bias voltage of the first small signal diode 725 and the voltage at the first FET drain 608D must sum to 1.25V in order that the first FET 608 is switched on. In this example therefore, the first FET 608 is switched on when its drain 608D is at 0.55V rather than at exactly 0V. It should be noted that ideally, switching may occur at 0V across the FET 608 for maximum efficiency. This zero-voltage switching advantageously prevents the first FET 608 from discharging the capacitors 606, 610 and thereby wasting energy stored in said capacitors 606, 610.

Figure 11:
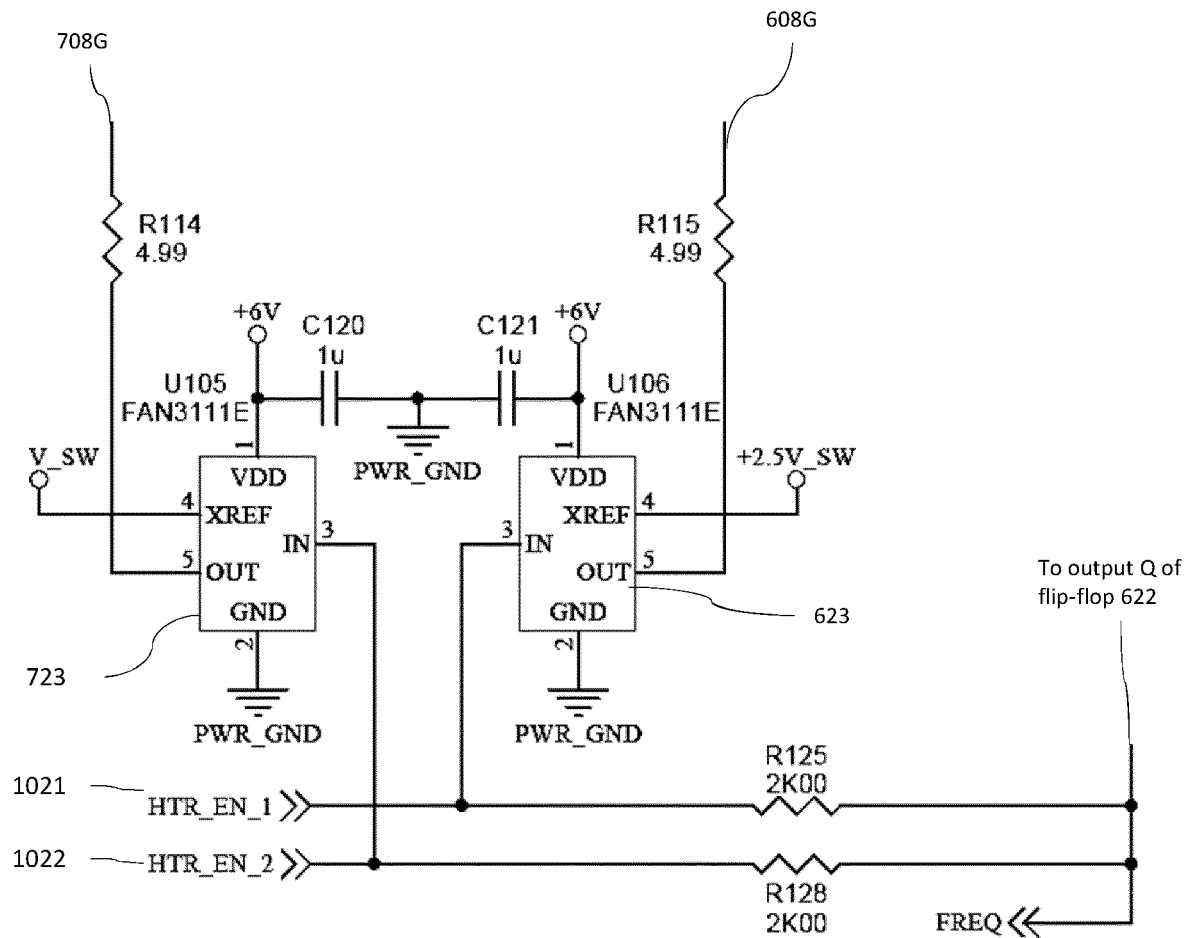

FIG. 11 shows in more detail the first and second gate drivers 623, 723 and their connection to the gates 608G, 708G of their respective FETs 608, 708. Each of the gate drivers 623, 723 has an input IN which is configured to receive a signal dependent on the heater activation signals 1021, 1022 supplied from the controller 1001. Additionally, the signals received by the inputs IN of the gate drivers 623, 723 are dependent on whether the signal output by the flip-flop output Q is high. The inputs IN are connected to the output Q of the flip-flop 622 via respective resistors R125, R128, which in this example each have a value of 2 kΩ.

The gate drivers 623, 723 each have two further inputs VDD and XREF wherein each input VDD receives a 6V power supply from the controller 1001 and XREF receives a 2.5V logic voltage, which in this example is the same logic voltage supplied by the controller 1001 to the flip-flop 622 and inverter gate U103. The inputs VDD of each of the first and second gate drivers 623, 723 are connected to a 6V supply voltage and the inputs VDD are connected to ground via two buffering capacitors C120, C121. The gate drivers 623, 723 also each have a terminal GND connected to ground wherein the terminals VDD and GND act to supply power to the gate drivers 623, 723. In this example, the capacitors C120, C121 each have a value of 1 µF. The gate drivers 623, 723 are configured to output gate drive voltages from respective outputs OUT. The outputs OUT of the gate drivers 623, 723 are connected respectively to FET gates 608G, 708G via resistors R114, R115, which in this example each have a resistance of 4.999.

Each gate driver 623, 723 is configured to receive a signal at its input IN to cause the gate driver to be activated only while a logic-high signal is provided from the flip-flop output Q and a heater activation signal 1021, 1022 is received from the controller 1001. An "open-drain" signal pin may be provided on the controller 1001 which is configured to provide the signals 1021, 1022.

In examples, initiation of the circuit 600 for heating by one of the resonator sections 601, 701 proceeds by the controller 1001 first initiating the desired one of the gate drivers 623, 723 by a respective one of the heater initiation signals 1021, 1022. The controller 1001 then supplies the START signal 1011 to the zero-voltage detector 621. The duration of the START signal 1011 should be shorter than the period of half a cycle of oscillation by the active resonator section 601, 701 (this period may be referred to as the "resonant fly-back period"). This allows the circuit to properly begin self-oscillating in response to a detected zero-voltage condition. In another example, the order the START signal 1011 and respective heater enable signal 1021, 1022 may be reversed such that the START signal 1011 is first applied to set the flip-flop Q output to high, and one of the heater initiation signal 1021, 1022 then applied to begin the self-oscillating of the resonator section 601, 701 corresponding to heater to which the signal 1021, 1022 is supplied.

Figure 12:
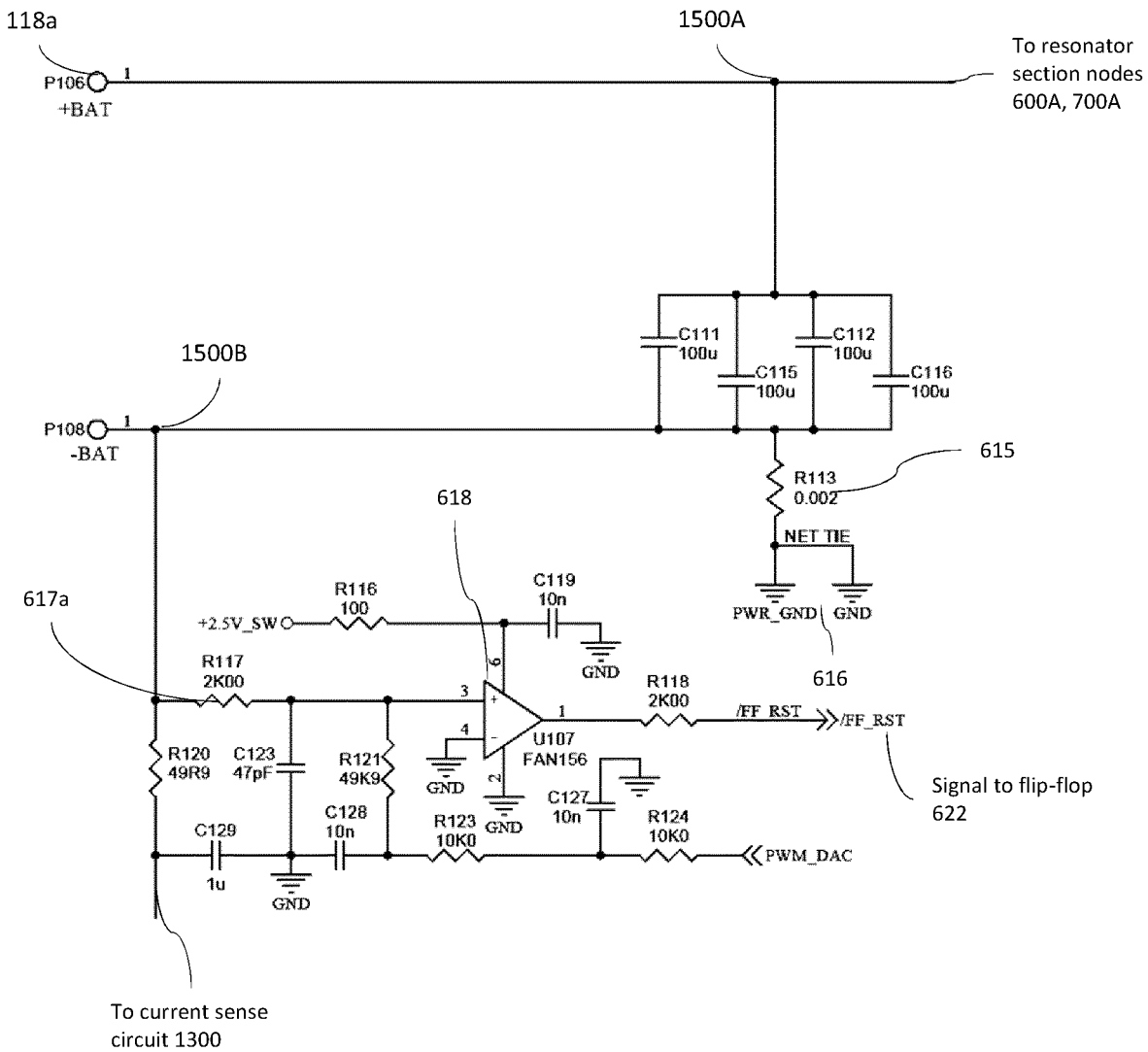

To continue with describing in more detail the control arrangement for controlling the circuit 600, FIG. 12 shows a portion of the control arrangement comprising the comparator 618 and associated components. In FIG. 12, the positive terminal 118a of the DC power supply 118 is shown connecting to a node 1500A which is connected to nodes 600A, 700A of the first and second resonator sections 601, 701 respectively. The negative terminal 118b of the DC power supply is connected to a node 1500B which is equivalent to the node 600D shown in FIG. 6. The node 1500B connects to ground 616 via the current sense resistor 615. Between the nodes 1500A and 1500B an arrangement of capacitors C111, C112, C115 and C116, each in this example having a capacitance of 100 µF, are connected in parallel, providing buffering between nodes 1500A and 1500B.

FIG. 12 shows in more detail components associated with the functioning of the comparator 618 for detecting that the current through the active inductor 124 or 126 has reached a given level. As described with reference to earlier figures, the comparator 618 acts to compare a voltage indicative of an amount of DC current flowing in the active inductor (124 or 126) to a control voltage 1031 originating from the controller 1001. The comparator 618 receives power via an input 6 which is connected via a 100Ω resistor R116 to a 2.5V logic power signal, in this example supplied by the controller 1001 and the same logic signal as the signal 621a received by the flip-flop 622. The comparator power input 6 is connected to ground via a 10 nF capacitor C119. A further terminal 2 of the comparator 618 is connected directly to ground.

In some examples, the controller 1001 is a micro-processing unit comprising a timer (not shown) for generating a signal which produces the control voltage 1031. In this example, the control voltage 1031 is produced by a pulse-width modulated signal PWM_DAC generated by the controller 1001. The timer of the controller 1001 generates a pulse-width modulated square waveform, with, for example, a magnitude of around 2.5V and a frequency of around 20 kHz and having a particular duty cycle. The pulse-width modulated signal PWM_DAC is filtered by 10 nF capacitors C127 and C128, and by two 49.9 kΩ resistors R121, R123 and a 10 kΩ resistor R124 to provide a substantially constant control voltage 1031 at the frequency at which the controller 1001 controls the control voltage 1031 (of, e.g., around 64 Hz in examples). To adjust the control voltage 1031, the controller 1001 in examples is configured to adjust the duty cycle of the pulse-width modulated signal PWM_DAC applied to the circuit 600. As such, the components positioned between the input PWM_DAC and the positive terminal of the comparator 618 effectively provide for the control voltage 1031 to be produced by a pulse-wave modulated signal and for the control voltage 1031 magnitude to be adjusted by adjusting the duty cycle of this pulse wave modulated signal. The control voltage line 619 shown in FIGS. 6 and 9 may thus be replaced by these components. However, in other examples, the control voltage 1031 may be produced by a substantially constant voltage supplied, for example, by the controller 1001. In such examples, some or all of the components for shown in FIG. 12 for filtering the signal PWM_DAC may not be present.

The node 1500B which is input to the comparator 618 positive input is, as mentioned above, equivalent to the node 600D of the circuit 600. It can be seen from FIG. 12 that, as described with reference to the simplified schematic shown in FIG. 6, the node 1500B is connected via the resistor 617a to the positive input of the comparator 618. As such, the operation of the comparator 618 is as described above: to receive an input at its positive terminal which is dependent on the control voltage 1031 and the voltage across the current sense resistor 615. When the voltage at the positive terminal of the comparator 618 reaches ground voltage, a signal/FF RST is output, via a resistor R118, to the flip-flop 622 input/RST to change the state of the flip-flop 622 and thereby switch the active FET 608/708 off.

Figure 13:
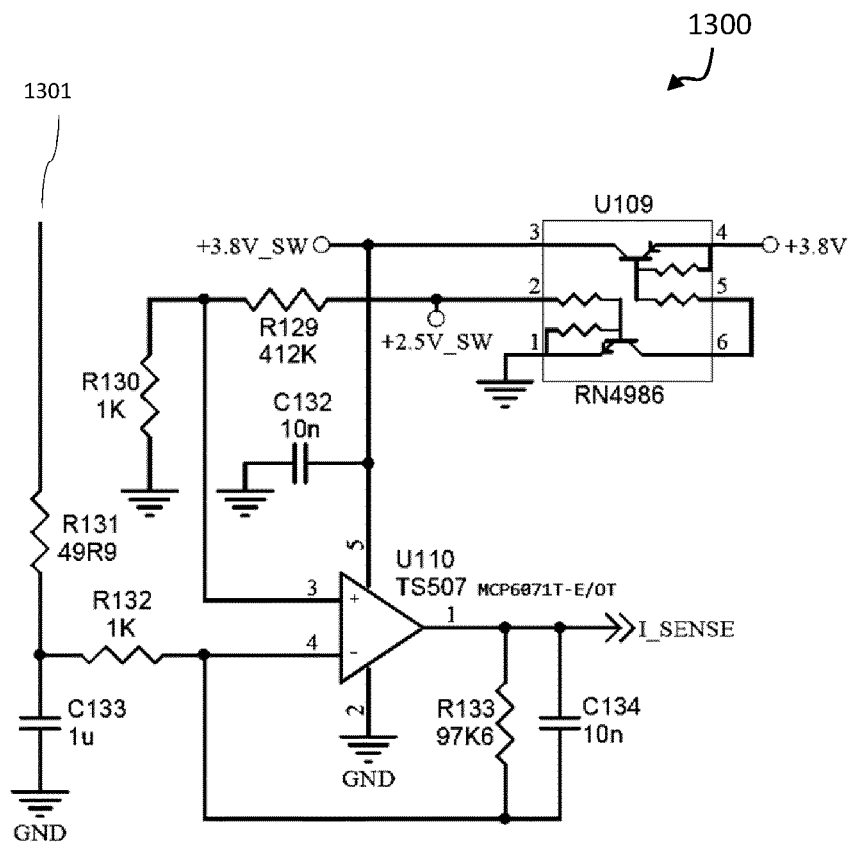

FIG. 13 shows further components for a particular example of the control arrangement for the circuit 600. The components shown in FIG. 13 define current sense apparatus 1300 for providing a signal I_SENSE indicative of an amount of current drawn from the DC voltage supply 118 during operation of the circuit 600. From this signal, the controller 1001 may determine a current drawn from the voltage supply 118, and may use this along with a value of the voltage supplied by the DC voltage supply 118 to determine a value for a power supplied to the circuit 600. In some examples, as will be described below, a determined value of power may be used by the controller 1001 for controlling the circuit 600.

An input 1301 to the current sense apparatus 1300 is provided via the resistor R120 shown in FIG. 12. The input is therefore connected to the node 1500B via the resistor R120 and receives a voltage indicative of the voltage across the current sense resistor 615. The current sense apparatus 1300 operates as a low-side current sensing apparatus for the circuit 600. In that regard, the current sense apparatus 1300 comprises an op-amp U110 running on a voltage of 3.8V supplied to an input 5 of the op-amp U110 (component type TS507) set up for low-side current sensing using the current sense resistor 615, as will be well understood. A transistor U109 with built-in bias resistor (component type RN4986) acts to switch a 2.5V supplied by the controller 1001 up to the 3.8V supply for the op-amp U110. The power supply line from the transistor component U109 is connected to ground via a 10 nF capacitor C132. Further, a 1 kΩ resistor R130 is connected between the positive input of the op-amp U110 and ground and a 412 kΩ resistor R129 is connected between the 2.5V input from the controller 1001 and the positive input of the comparator U110. The negative terminal of the op-amp U110 receives a voltage dependent on the voltage across the current sense resistor 615. A resistor R131 and capacitor C133 in series provide filtering of the voltage signal received via the input 1301. A further resistor R133 (in this example having resistance of 97.6 kΩ) and a 10 nF capacitor C134 are connected in parallel between the input to the negative terminal of the op-amp U110 and the output of the op-amp U110 such that op-amp operates in a closed-loop mode.

The position of the current sense resistor 615, which, as mentioned above, in one example is a 2 mΩ resistor, in the circuit allows for a plurality of parameters to be measured with one current sense resistor, which may allow for good efficiency. That is, the position of the current sense resistor 615 in the circuit allows measurement of: the FET peak current, which may be used, for example, in control of the induction heating power of the circuit; the average current out of the battery, which may be used in monitoring discharge of the battery and setting the induction power; and the average current into the battery, which may be used, for example, in monitoring charging of the battery.

The op-amp U110 operates to output a voltage signal I_SENSE to the controller 1001 which is indicative of the current through the current sense resistor 615 and thus allows the controller 1001 to determine the current drawn from the DC voltage supply 118 through the circuit 600.

It should be noted that having regard to the first and second FETs 608 and 708, and the topology of the circuit 600, the phasing of the first and second inductor coils 124 and 126 with respect to each other may be chosen such that when the first inductor coil 124 is being operated, current sufficient to cause significant heating of the susceptor 132 is prevented from flowing in the second inductor coil 126, and when the second inductor coil 126 is being operated, current sufficient to cause significant heating of the susceptor 132 is prevented from flowing in the first inductor coil 124.

As described above, the first 608 and second 708 FETs effectively act as diodes 608a, 708a when switched off and so may conduct a current if they are forward biased (i.e. the FETs are not perfect switches). Accordingly, in examples the circuit 600 may be configured so that when one of the first 124 and 126 inductor coils is active to heat the susceptor 132, the voltage induced across the other inactive inductor coil does not forward bias the intrinsic diode of the FET associated with that inactive inductor coil but instead reverse biases it.

The effect of the above described control arrangement being configured to control the switching arrangements 608, 708 of the circuit 600 in response to detected voltage conditions is that when one of the first resonator section 601 and the second resonator section 701 is active (i.e. its gate driver 623, 723 is activated by the controller 1001) that resonator section "self-oscillates", while the other section remains inactive. That is, switching of the respective FET 608, 708 in the resonator section 601, 701 repeats at a high frequency as a first voltage condition (detected by the comparator 618) causes the FET to be switched from on to off, and a second voltage condition (detected by the zero-voltage detector 621) causes the FET to be switched from off to on.

The controller 1001 is configured to control the induction heating circuit 600 of the device 100 such that only one of the first inductor 124 and the second inductor 126 is active at any one time. The controller 1001 is configured to determine at a pre-determined frequency which of the first inductor 124 and the second inductor 126 to activate.

In examples, during usage of the device 100 the controller 1001 determines at the pre-determined frequency, i.e. one time for each of a plurality of pre-determined time intervals, which of the first resonator section 601 and the second resonator section 701 to activate. In one example, each time the controller 1001 determines which of the first resonator section 601 and the second resonator section 701 to activate, the controller 1001 may determine to activate that resonator section to heat the susceptor 132 for the duration of the next pre-determined interval. That is, where the pre-determined frequency (which may be referred to as an "interrupt rate") is 64 Hz, for example, the controller 1001 may determine at pre-determined intervals of 1/64 s, which resonator section 601, 701 to activate for a following duration of 1/64 s until the controller makes the next determination of which resonator section 601, 701, at the end of the following 1/64 s interval. In other examples, the interrupt rate may be, for example, from 20 Hz to 80 Hz, or correspondingly the pre-determined intervals may be of length 1/80 s to 1/20 s. In order to determine which inductor 124, 126 is to be activated for a pre-determined interval, the controller 1001 determines which susceptor zone 132a, 132b should be heated for that pre-determined interval. In examples, the controller 1001 determines which susceptor zone 132a, 132b should be heated with reference to a measured temperature of the susceptor zones 132a, 132b, as will be described below.

Figure 14:
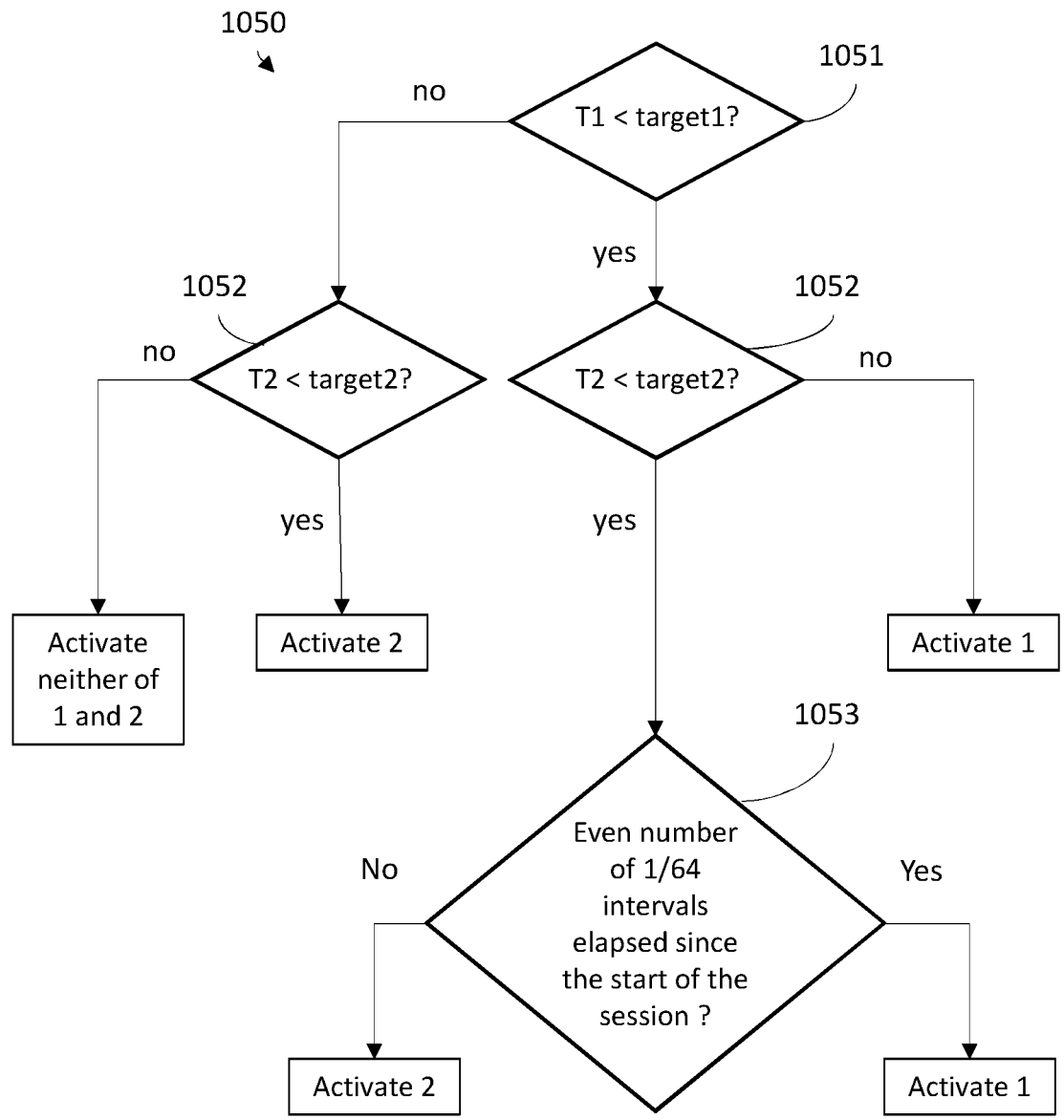
FIG. 14 shows a flow chart representation of an example method of controlling aspects of an example induction heating circuit.

FIG. 14 shows a flowchart representation of an example method of determining which of the two resonator sections 601, 701, should be activated for a particular pre-determined interval. In this example, the controller 1001, determines which of the first 601 and second 701 resonator sections to activate for the pre-determined interval based on a present temperature T1 of the first susceptor zone 132a heated by the first inductor 124 and a present temperature T2 of a second susceptor zone 132b heated by the second inductor 126. In an example, the present temperatures T1 and T2 of the first 132a and second 132b susceptor zones may be measured by respective thermocouples (not shown) attached to each zone of the susceptor 132. The thermocouples provide an input to the controller 1001 allowing the controller 1001 to determine the temperatures T1, T2. In other examples, other suitable means may be used to determine the respective temperatures of the susceptor zones 132a, 132b.

At 1051, the controller 1001 determines a present value of the temperature T1 and compares this to a target temperature target1 for the first zone 132a arranged to be heated by the first inductor 124. The target temperature target1 of the first zone 132a has a value which may vary throughout a usage session of the device employing the circuit 600. For example, a temperature profile may be defined for the first zone defining values for target1 throughout a usage session of the device 100.

At 1052 the controller 1001 performs the same operation as was performed for the first inductor 124 at 1051 and determines whether the present temperature T2 of the second zone 132b is below the target temperature target2 for the second zone 132b at this time. Again, the target temperature of the second zone 132b may be defined by a temperature profile defining values of target2 throughout a usage session. The temperature of the second zone 132b may, similarly to the first zone 132a, be measured by any suitable means such as by a thermocouple.

If the answers at 1051 and 1052 are both "no", i.e. both susceptor zones 132a, 132b are presently at or above their respective target temperatures target1, target2, then the controller 1001 determines neither of the first and second resonator sections 601, 701 should be activated for the next pre-determined interval.

If the answer at 1051 is "no" and the answer at 1052 is "yes", i.e. the first zone 132a is at or above its target temperature target1 but the second zone 132b is below its target temperature target2, then the controller 1001 determines that the second resonator section 701 should be activated to heat the second zone 132b for the next pre-determined interval.

If the answer at 1051 is "yes" and the answer at 1052 is "no", i.e. the first zone 132a is below its target temperature target1 and the second zone 132b is at or above its target temperature target2, then the controller 1001 determines that the first resonator section 601 should be activated to heat the first zone 132a for the next pre-determined interval.

If the answer at 1051 is "yes" and the answer at 1052 is "yes", i.e. both the first 132a and second 132b zones are below their respective target temperatures target1, target2, then the controller 1001 continues to 1053. At 1053 the controller 1001 effectively acts to alternate activation of the first resonator section 601 and second resonator section 701 for each pre-determined interval that both zones 132a, 132b remain below their respective target temperatures.

In one example, in order to alternately activate the first 601 and second 701 resonator sections, at 1053 the controller 1001, in some examples, determines if an even number of predetermined intervals has elapsed since the start of the session. If an even number of predetermined intervals has elapsed since the start of the session then the controller 1001 determines that the first resonator section 601 should be activated for the next interval. If an odd number of predetermined intervals has elapsed since the start of the session then the controller 1001 determines that the second resonator section 701 should be activated for the next interval. In other examples, it should be understood, that the controller 1001 may instead activate the second resonator section 701 when an even number of intervals has elapsed and the first resonator section 601 when an odd number of intervals has elapsed.

In certain examples, the circuit 600 is configured such that once one of the resonator sections 601, 701 is activated by receipt of a signal 1021 or 1022 at one of the gate drivers 623, 624, the that resonator section 601/701 continues to operate, i.e. self-oscillate, until deactivated by the controller

1001, for example by providing a different signal to the gate driver of that resonator section 601/701. As such, upon determining which of the resonator sections 601, 701 to activate during a given interval, the controller 1001, in order to initiate this activation may deactivate one of the resonator sections 601, 701 which was active during a previous interval.

To illustrate an example of 1053 where method 1050 shown in FIG. 14 is performed with intervals of 1/64 s, if the controller 1001 determines that both zones 132a, 132b are below their respective target temperatures target1, target2 and an even number of 1/64 s intervals has elapsed since the start of the usage session of the device 100, then the controller 1001 activates the first resonator section 601 for the next 1/64 s interval while the second resonator section 701 is rendered inactive, which in examples requires the controller 1001 deactivating the second resonator section 701. If after this next interval of 1/64 s both zones 132a, 132b remain below their respective target temperatures target1, target2, then for the following 1/64 s interval the controller 1001 activates the second resonator section 701 while the first resonator section 601 is rendered inactive, which in examples requires the controller 1001 deactivating the second resonator section 701. For each interval in which both zones 132a, 132b remain below their respective target temperatures this alternating between activating the first 601 and second 701 resonator sections continues.

Altogether, the method 1050 has the effect that the two inductors 124, 126 are never activated at the same time. Where it is determined that both inductors 124, 126 require activation to bring their respective zones 132a, 132b to target temperature the controller 1001 alternates the supply of power to the inductors 124, 126 at the pre-determined frequency to bring both zones 132a, 132b up to their respective target temperature. Therefore, during a usage session, both susceptor zones 132a, 132b may be at a temperature to produce an aerosol at a particular point in the usage session, but at such a point in the usage session, activation of the inductor coils 124, 126 to heat their respective susceptor zone 132a, 132b may be alternating at a particular frequency, such as 64 Hz. It can be seen that, for example, during a period of a usage session comprising a plurality of intervals where the first zone 132a, is substantially below its target temperature and the second zone 132b is at or above its target temperature, the method 1050 has the effect that power may be supplied to the first resonator section 601 for close to 100% of this period. However, for a period of a usage session comprising a plurality of intervals in which both zones 132a, 132b are below their target temperatures, each inductor may receive power for roughly 50% of this period.

In examples, the controller 1001 is also configured at pre-determined intervals, which in examples coincide with the pre-determined intervals at which the method 1050 is performed, to determine a power being supplied to one of the resonator sections 601, 701 from the DC supply 118.

As described above, with reference to FIGS. 9 to 11 in particular, in order to control which of the first resonator section 601 and second resonator section 701 is active at any one time, the controller 1001 as well as transmitting a START signal 1001 to initiate operation of the circuit 600 is configured to selectively transmit a first heater operation signal 1011 to the first gate driver 623 to activate the first resonator section 601 or a second heater operation signal 1012 to the second gate driver 723 to activate the second resonator section 701.

For example, when the controller 1001 initiates operation of the circuit 600 and the controller 1001 transmits the first heater operation signal 1011, the circuit 600 operates as described above to activate the first inductor 124 to heat the first susceptor zone 132a. When the controller 1001 transmits the second heater operation signal 1012 the circuit 600 operates to activate the second inductor 126 to heat the second susceptor zone 132b. If the controller 1001 transmits neither of the first heater signal 1011 and the second heater signal 1012 then neither inductor 124, 126 is activated and the susceptor 132 is not heated.

The controller 1001 is configured to control the power supplied from the DC voltage supply 118 to the circuit 600 for inductive heating of the susceptor 132 based on a comparison of a measurement of power supplied to the circuit 600 and a target power. The controller 1001 is configured to control the power supplied to the circuit 600 by controlling the switching arrangement of the circuit 600, i.e. by controlling switching of the FETs 608, 708. The controller 1001 may control switching of the FETs 608, 708 by setting the control voltage 1031 which determines the DC current which is allowed to build up in the inductor 124, 126 corresponding to that FET 608, 708 before the FET 608, 708 is switched off.

Figure 15:
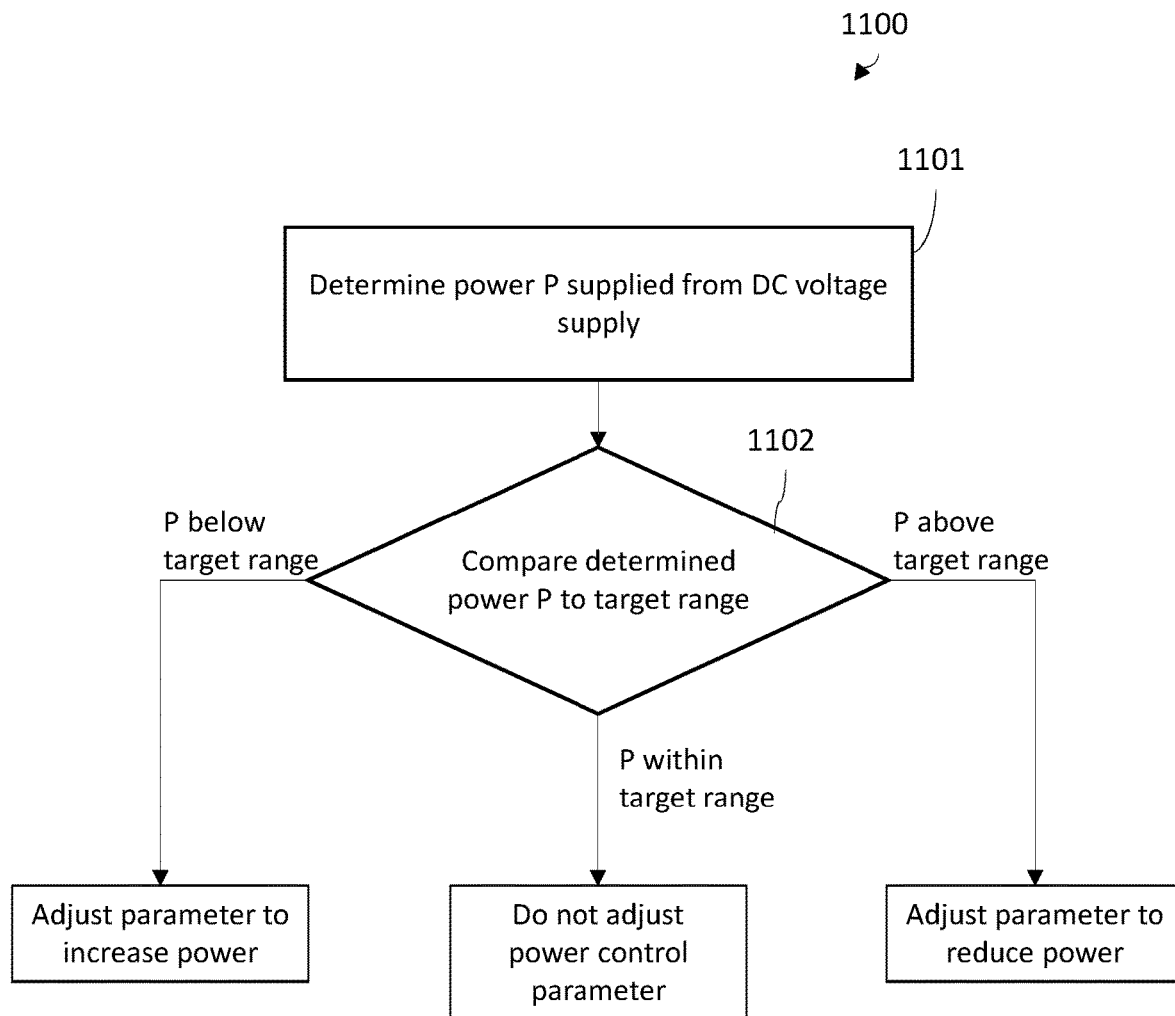
FIG. 15 shows a flow chart representation of another example method of controlling aspects of an example induction heating circuit.

FIG. 15 shows an example method 1100 performed by the controller 1001 to control the power supplied to the circuit 600. At 1101 the controller 1001 determines the power P supplied from the DC supply 118 to the circuit 600. For example the controller 1001 may determine an average of the power supplied to the circuit 600 during the previous pre-determined interval. In examples, the power P being supplied to the circuit 600 during an interval may be determined by measurement of the voltage across and DC current being driven through a given one of the resonator sections 601, 701. The controller 1001 may then determine the product of the voltage across and DC current through the given one of the resonator sections 601, 701 to determine the power P supplied to that resonator section 601, 701.

In examples, the determined power P is an average power supplied from the DC supply 118 over the pre-determined interval which may be determined by determining a product of the average DC voltage across the DC supply 118 and the average DC current drawn from the DC supply 118 over the previous interval.

In the example device 100, the DC supply 118 is a battery which is connected to the controller 1001, and the controller 1001 then outputs the voltage of the DC supply 118 to the circuit 600. The controller 1001 is configured to determine the DC voltage supplied by the battery 118. The current drawn from the battery 118 is determined by the operation of the current sense apparatus 1300. The controller 1001 determines the DC voltage and DC current once for every 1/64 s interval. The DC voltage can be considered to be essentially constant over this short time period. However, the current is varying at a rate dependent on the rapid rate of switching on and off the circuit. As described above, this is around 300 kHz in some examples. The current sense apparatus 1300 as described above with reference to FIG. 13, outputs a signal I_SENSE which is filtered to remove this around 300 kHz signal. An average DC current for the 1/64 s interval is therefore obtained by taking a measurement of this filtered signal I_SENSE, and the measurement of I_SENSE is taken just before the end of the 1/64 s interval in order to allow the signal from the filter to settle. The controller 1001 thereby obtains a DC voltage and DC current measurement for the 1/64 s interval and can calculate a product of these values to obtain the determined power P.

This determined power P may be considered to be an average of the power supplied by the DC supply 118 over the 1/64 s interval.

At 1102 the supplied power P determined at 1101 is compared to a target power. Where the determined power P is an average power over the pre-determined interval, the target power is a target average power over the same interval. In one example, the target power is a target for the average power supplied over the pre-determined interval and may have a value of between 10 and 25 W, or between 15 and 23 W, or around 20 W. In this example, the target power is a range, for example, 20-21 W or of 15-25 W. The controller 1001 may accordingly at 1102 compare the supplied power value P determined at 1101 to the target range and determine whether the supplied power is below the range, within the target range, or above the target range. For example, where the target range is 20-21 W, at 1102 the controller 1001 determines whether P<20 W, or 20 W≤P≤21 W, or P>21 W.

Based on the comparison of the supplied power P to the target range, the controller 1001 determines whether and how to adjust the power for the next pre-determined interval with the aim of bringing the actual power supplied to the active inductor 124 or 126 during the next pre-determined interval towards the target power range. That is, if the supplied power P is below the target range, then the controller 1001 determines to increase the power supplied to the circuit 600 over the next pre-determined interval. If the supplied power P is above the target range, then the controller 1001 determines to decrease the power supplied to the circuit 600 over the next pre-determined interval. If the supplied power P is below the target range, then the controller 1001 determines not to adjust the power supplied to the circuit 600 over the next pre-determined interval.

Due to the configuration of the circuit 600 described above, the supplied power P for a given pre-determined interval is dependent on the value of the control voltage 1031 for that interval. Taking the example of one 1/64 s interval for which the first resonator section 601 is active, this 1/64 s interval comprises many repeating cycles comprising sections 800a to 800e of the voltage trace 800 and repeats thereof. For each cycle during the period of time $t_0$ to $t_0$ the resonator section 601 is allowed to resonate, and since for this period the FET 608 is off, no power is drawn from the DC supply 118 through the first resonator section 601. Substantially all of the power drawn from the DC supply 118 during the given 1/64 s interval to power the resonator section 601 is thus drawn during the period between $t_0$ and $t_1$ while the inductor 124 is being "energized" with current, i.e. while the FET 608 is on. The time between $t_1$ and $t_0$ is determined by the resonant frequency of the first resonator section 601. This resonant frequency may remain substantially constant, at least throughout a given 1/64 s interval (although may vary over the period of operation of the circuit 600 due to dependence on coil and susceptor temperature and battery voltage). The length of time $t_0$ to $t_1$ is determined by the value of the control voltage 1031, as well as the DC voltage supplied by the DC supply 118 and the resistance and inductance of the first resonator section 601 (the same applying for the second resonator section 701). That is, for a given DC supply voltage, the control voltage 1031 sets the current $I_1$ which is allowed to build up in the inductor 124 between $t_0$ and $t_1$, but where the DC supply voltage is reduced, the time required to build up a given value of $I_1$ is increased. As such, the average power supplied during the 1/64 s interval is dependent on the value of the control voltage 1031.

In examples, therefore, in order to control the power supplied to the circuit 600 during the next interval the controller 1001 sets the value of the control voltage 1031 for the next interval. In examples, for a given DC supply 118 over a pre-determined interval during which one of the resonator sections 601, 701 is active, a larger positive value of the control voltage 1031 results in a larger value of power P being delivered to the circuit 600. Therefore, in such examples, where the controller 1001 determines that the supplied power P over the last interval was above the target range, the controller 1001 reduces the control voltage 1031 for the next interval. Where the controller 1001 determines that the supplied power P over the last interval was below the target range, the controller 1001 increases the control voltage 1031 for the next interval. And, where the controller 1001 determines that the supplied power P over the last interval was above the target range, the controller 1001 leaves the control voltage 1031 unchanged for the next interval.

It should be noted that in one example of the above method 1100 the power supplied P is determined at 1101 is a power supplied to a particular one of the resonator sections 601, 701. For example, the power P may be determined by measuring the voltage across the first resonator section 601 and the DC current through the first resonator section 601. In such an example, it is the power P supplied to the first resonator section 601 which is used to control the control voltage 1031. It should also be noted that for a given control voltage 1031, in some examples, the power supplied to each of the inductors 124, 126 when the respective resonator sections 601, 701 are active may be different. This may be, for example, because the inductors 124, 126 have different values of inductance or DC resistance, or the capacitance of the two resonator sections 601, 701 is not equal. Therefore, in this example, during a given pre-determined interval, a target power outside of the target power range may be supplied to the second resonator section 701 but since the control voltage 1031 is controlled based on the power P supplied to the first resonator section 601, in this example the controller 1001 may not adjust the control voltage 1031.

For example, for a given value of the control voltage 1031, the controller 1001 may determine at 1101 that an average power of 20 W was supplied to the first resonator section 601 over a given interval, with the target voltage in this example being 20-21 W. At 1102 the controller 1001 determines that the supplied voltage was within the target range and accordingly the controller 1001 determines not to adjust the control voltage 1031. Consider that for the next pre-determined interval, the controller 1001 determines (by the example method 1050) that the second resonator section 701 and not the first resonator section 601 is to be activated. For the given value of the control voltage 1031, in this example, 22.5 W is delivered due to differences in the electrical properties of the first 601 and second 701 resonator sections. However, in this example, at 1102 the controller 1001 compares the last measured value of power P delivered to the first resonator section 601 and therefore determines at 1103 not to adjust the control voltage 1031. As such, in an example of the method 1100 the actual power supplied to the circuit 600 may be outside of the target range. However, this may allow for controlling the power supplied to the inductors 124, 126 by measuring only the power P supplied to one of the resonator sections 601, 701. This may provide a simple and useful solution to maintain the power supplied to the circuit 600 to within an acceptable range if, for example, the resonator sections 601, 701 and components thereof have roughly similar electrical properties.

As mentioned above, in some examples, the DC supply 118 is a battery with a voltage of around 2 to 10V, or 3 to 5V, or in one example around 4.2V. In some examples, the DC voltage produced by the DC supply 118 may change, e.g. decrease, over the time that the circuit 600 is operated. For example, where the DC voltage source 118 is a battery, the battery may initially supply a voltage of 4.2V but the voltage supplied by the battery may reduce as the battery depletes. After a given period, therefore, the DC voltage source 118 may supply, for example, 3.5V instead of an initial 4.2V.

As described above, at a given supply voltage, the value of the control voltage 1031 controls the amount of current which is allowed to build up in the active inductor 124/126 before the respective FET 608/708 is switched off. Power is supplied from the DC voltage supply 118 to "energize" the active inductor 124/126 by allowing a build-up of DC current when the FET 608, 708 is on. As was also described above, the time $t_1$ for the current to build up to the value which causes switching of the FET 608/708 is dependent on the DC voltage supply. Therefore, for example, if the voltage supplied by the DC supply 118 reduces, the rate at which current builds up in the inductor coil 124 reduces, resulting in reduced power P being supplied to the circuit 600.

The example method 1100 may provide for a target power to be maintained even in the event that the supplied voltage from the DC supply 118 changes. That is, since an actual supplied power P is determined and used to control the control voltage 1031, the controller 1001 can act to maintain a target power by adjusting the control voltage 1031. For example, where the battery level has depleted, the controller 1001 measures that the power P supplied to the circuit 600 at a given control voltage 1031 has reduced, and acts to increase the power P supplied to the circuit by increasing the control voltage 1031. As such, a target power level may be maintained while a battery used to power the circuit 600 depletes. This is advantageous since maintaining a target power level may provide for optimal efficiency of operation of the induction heating circuit 600. For example, maintaining a substantially constant power supplied allows for consistent heating of the aerosolizable material 110a regardless of supply voltage. Similarly, the example method 1100 provides for providing a substantially constant power regardless of other changing factors in the circuit which might affect the amount of power delivered, such as different loading on the circuit 600 being provided by the susceptor 132 when the susceptor 132 temperature increases. This provides a consistently good experience for the consumer, for example by providing a consistent time to first puff, i.e. a consistent time between the device 100 being activated and being ready to provide aerosol to be inhaled by the user.

In another example, the measured power value P upon which control of the control voltage 1031 is based is changed throughout a usage session. For example, during a particular usage session, for a first part of the usage session (e.g. a first ~60 s of the usage session), the temperature profile may be such that the first inductor 124 is primarily active, while the second inductor 126 is inactive. For this first part of the usage session, it may be appropriate to base control of the control voltage 1031 on measurements of the power delivered to the first resonator section 601. However, later in the session, again e.g. due to the temperature profile for the session, it may be that the second inductor 126 is primarily active, while the first inductor 124 is active for less of the time. Thus, for a second part of the usage session (e.g. after ~60 s), it may be advantageous to control the control voltage 1031 based on the measurements of power delivered to the second resonator section 701. The controller 1001 may accordingly switch from basing control of the control voltage 1031 on measurements of power supplied to the first resonator section 601 to basing control of the control voltage 1031 on measurements of power supplied to the second resonator section 701. In this way, the target power may be more closely adhered to throughout a usage session, since, for example, the control voltage 1031 is being set based on a comparison of the actual power being delivered to the active inductor 124, 126 to the target power range.

In some examples, where the controller 1001 determines at 1103 that the power should be adjusted, the controller 1001 may adjust the control voltage 1031 in pre-determined steps. For example, the controller 1001 may be configured to adjust the control voltage 1031 by a pre-determined amount per pre-determined time interval. Where at 1102 the controller 1001 determines that the supplied power P was below the target power range the controller 1001 may increase the control voltage 1031 by a pre-determined number of volts for the next pre-determined interval. Conversely, where at 1102 the controller 1001 determines that the supplied power was above the target power range the controller 1001 may increase the control voltage 1031 by a pre-determined amount for the next pre-determined interval.

In the example described above with reference in particular to FIG. 12, the control voltage 1031 is produced by a pulse-wave modulated signal PWM_DAC. The signal PWM_DAC, as described above has a rectangular waveform at 2.5V. The duty signal of the signal PWM_DAC is controllable by the controller 1001 which sets a value of 0 to 800 for the PWM_DAC duty cycle, this value corresponding to a duty cycle of 0% at 0 and 100% at 800. The signal PWM_DAC when filtered provides the substantially constant control voltage 1031 and therefore the settings of from 0 to 800 of the duty cycle of the PWM_DAC signal provide for the control voltage 1031 to have a magnitude of from 0 to 2.5V. In this example, the controller 1031 may adjust the duty cycle setting of the PWM_DAC signal by a set amount, such as 8 out of 800, or leave the setting unchanged, for each pre-determined interval. In another example, the controller 1001 may provide for the control voltage 1031 to be adjusted by some other means, and if the controller 1001 determines that the control voltage 1031 should be adjusted, the controller 1001 may adjust the control voltage 1031 by, e.g., 1%, or 2%, or 5% of the maximum value of the control voltage 1031 for the next pre-determined interval.

In some examples, when operation of the circuit 600 is initiated by the controller 1001, e.g. to start a use session of the device 100 comprising the circuit 600, the control voltage 1031 is set to a pre-determined initial value. In one example, a value of the control voltage 1031 (for example, a duty cycle setting of the signal PWM_DAC which produces this value of the control voltage 1031) which corresponds with a target power level is determined during setup of the circuit 600. That is, the power delivered to the circuit 600 may be determined (e.g. measured or determined theoretically) for a number of values of the control voltage 1031, for example to produce a calibration curve. A value of the control voltage 1031 corresponding to the target power may then be determined. In one example, the DC supply 118 may supply 4.2V and to achieve a target power of 20 W the controller 1001 may determine in an example calibration a value for the duty cycle of the PWM_DAC signal setting of around 344 out of 800.

In one example, the controller 1001 is configured to set the control voltage 1031 at an initial value which is based on this determined value of the control voltage 1031. For example, the initial value of the duty cycle of PWM_DAC which determines the control voltage 1031 may be set at half of the determined value corresponding to the target power. For example, where the duty cycle setting for the control voltage 1031 found to correspond with the target power is 344 out of 800, the controller 1001 may begin the session with the setting being set at 152 out of 800, and increase the setting by a pre-determined amount with every pre-determined interval until the measured power P is within the target range. This may have the effect that at the start of a usage session, the power delivered is well below the target power and the power delivered may then ramp up (by ramping up by the controller 1001 of the control voltage 1031) until it reaches the target power range. This initial ramping up of the power delivered may provide for improved safety in operation of the circuit 600, preventing overheating of the susceptor at the start of a session and allowing the circuit 600 to respond to the actual power supplied as determined by the controller 1001.

In one example, the pre-determined interval is the same pre-determined interval as is used by the controller 1001 in the method 1050 of determining which of the first 124 and second 126 inductors to activate. In one such example, as mentioned above, the pre-determined intervals are of length ¹⁄₆₄ s. The length of the pre-determined interval (or equivalently the interrupt rate) may be chosen to provide an advantageous time interval at which the controller can monitor the circuit and adjust parameters accordingly. For example, an interrupt rate of 64 Hz, or within a range of approximately 10-100 Hz may be used. At these example interrupt rates, the controller 1001 may measure increases in temperature of the susceptor zones at a sufficiently high rate that it may determine to stop heating by a particular inductor 124, 126 before a zone 132a, 132b of the susceptor 132 can increase too far above its target temperature. Similarly, examples given for the interrupt rate may provide an advantageous frequency at which the control voltage 1031 may be adjusted to allow appropriate control of power supplied to the inductors 124, 126 to within a safe target range.

In an example method of operation of the circuit 600, a target power for use by the controller 1001 in controlling power delivered to the circuit 600 is pre-determined based on characteristics of a planned usage session. For example, the target power range may be adjusted throughout a usage session.

Figure 16:
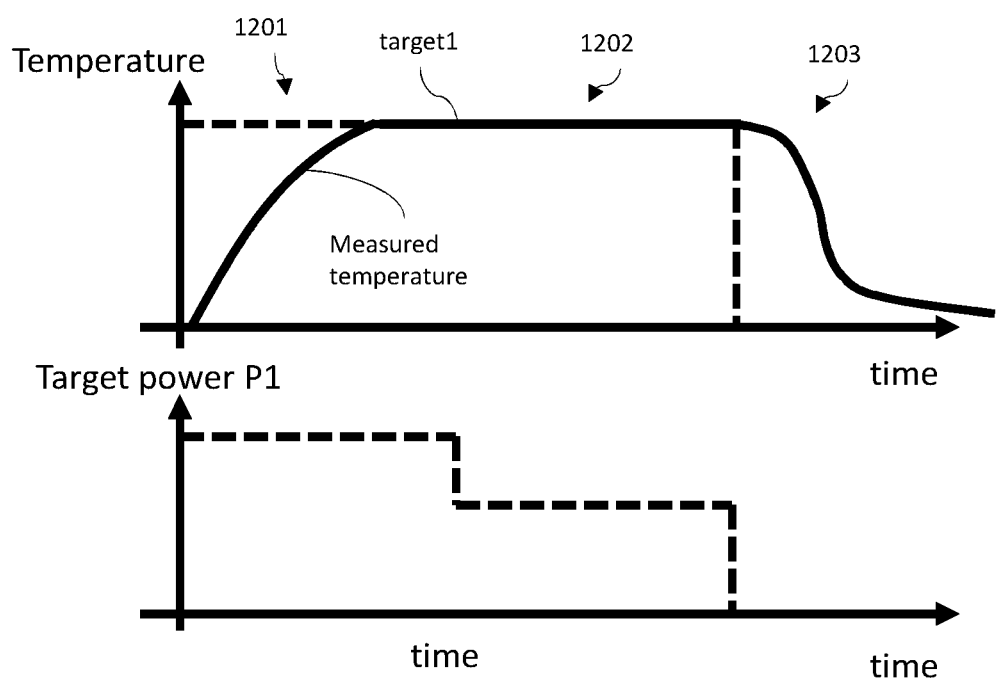
FIG. 16 shows a schematic representation of a temperature of a susceptor and a target power to be supplied to heat the susceptor throughout an example usage session of an aerosol generating device according to an embodiment.

FIG. 16 shows a schematic example of a temperature profile target1 for a portion of a usage session, which in this example is a target temperature for the single susceptor zone 132a. In this example, initially at a first part 1201 of the portion of the usage session, the first zone 132a is substantially below its target temperature target1. At this first part 1201, the circuit 600 is operating to bring the first zone 132a up to the target temperature target1. At such an example part of the usage session, a target power P1 may have a range of values of, for example, 20-21 W. The target power during the first part 1201 of the session may be relatively high in order to bring the susceptor 132, and therefore the aerosolizable material 110a, up to temperature quickly to a temperature suitable for producing aerosol for inhaling by the user.

As the usage session progresses, the first zone 132a substantially reaches its target temperature target1. A second part 1202 of the usage session may be defined beginning shortly after the first zone 132a reaches its target temperature target1. For instance, for this part 1202 of the usage session, the first zone 132a may be substantially at its target temperature target1, of e.g. 250° C., and may be being maintained at the target temperature target1 according to the method 1050. Similarly, although this is not shown in FIG. 16, the second zone 132b may be being maintained at its own target temperature target2 by the method 1050 (and the target temperature target2 of the second zone 132b may define a different temperature profile to that defined by target1).

The part 1202 in the usage session after the first zone 132a substantially reaches temperature target1 may be characterized in that the controller 1001 is operating to maintain the temperature of the first zone 132a (or of both zones 132a, 132b) rather than to bring the temperature of the first zone 132a up to its target value target1, as in the first part 1201. As such, during the part 1202 of the usage session, relatively little power may be required to be supplied to the susceptor zone 132a to maintain the target temperature target1, when compared to the power required to bring the susceptor zone 132a up to the target temperature target1. At the second part 1202 of the usage session, it may be advantageous to reduce the value of target power P1 compared to its value in part 1201. In one example, the target power level P1 may be reduced from 20-21 W in part 1201 to around 15 W during part 1202 of the usage session. In another example, the target power P1 may be reduced to around 12-13 W or to around 9 W. Reducing the target power P1 in this way may be advantageous in some examples because by using a lower level of power energy losses in the circuit may be reduced, and thus efficiency may be increased.

For a third part 1203 of the usage session, the value of the target temperature target1 is 0, i.e. the first inductor 124 is not to be activated. At this point, the target power P1 may also be reduced to 0 if the usage session has come to an end, or if the second inductor 126 is still being activated, then the target power P1 may remain at a non-zero value while the second inductor 126 is activated. Accordingly, the target power may take into account the temperature profile of both zones 132a, 132b at any one point in the usage session. If a part of the usage session, for example, requires one of the zones to be significantly increased in temperature, then a relatively high target power may be appropriate. Conversely, for parts of a usage session where neither zone 132a, 132b requires substantial heating, a relatively low target power may be used.

As mentioned above, use of lower power levels during certain periods of a usage session may provide advantages in that an energy saving may be achieved over the duration of a session. For example, where the target power level is reduced from 20-21 W in the first period to around 15 W in the second period, in some examples an energy saving of around 5-10% may be achieved due to reduced energy losses in the circuit 600 when operating at lower power. In one example, over the course of a typical session of around 260 s in length, maintaining the target power at around 20 W for the full duration of the session may result in energy usage of around 1000 J. However, reducing the target power to around 15 W upon the first zone 132a first reaching its set temperature and maintaining the target power level at 15 W for the remainder of a session of substantially the same length may result in an energy usage of between 900 and 950 J. In examples, almost all of the power used by the device is due to energy supplied to heat the susceptor 132. The power usage of electrical components other than the heating circuitry, e.g. LED indicators and the microcontroller, may be less than around 0.1 W and in some examples may be less than around 0.01 W.

It should be appreciated that a method of determining a power supplied and comparing to a target power and adjusting the power supplied based on this comparison may be applied in example heating circuits for an aerosol generating device other than those described in examples herein. Furthermore, the principles of the method of adjusting the target power throughout a usage session may also be applied with other example circuits, for example in an example circuit which uses a resistive heating element to heat an aerosolizable material, rather than an inductive element. That is, it will be appreciated from the above disclosure that energy savings, for example of around 5-10%, may be achieved in certain examples by reducing a target power to be supplied to a heating arrangement for heating an aerosolizable material. In particular, in examples, this reduction in target power may be implemented advantageously once a target temperature for a given point in a usage session has been reached such that an example device is operating to maintain rather than increase a temperature of a heating arrangement such as a resistive heating element.

Certain methods described herein may be implemented by way of non-transitory computer program code that is storable on a non-transitory storage medium. For example, in certain examples, the controller 1001 may comprise a non-transitory computer readable storage medium comprising a set of computer-readable instructions stored thereon and a processor to perform a method described herein when executed by the controller 1001. The controller 1001 may comprise one or more processors. For example, in some examples, as described above, the controller 1001 is a programmable micro-processing unit. The controller 1001 may comprise a storage medium comprising a set of machine readable instructions, e.g. in the form of computer code, which when executed by the controller 1001 cause a method described herein to be performed.

It should be noted that although a circuit comprising two inductor coils has been described above, aspects described above, such as for controlling power supplied in an inductive heating circuit may be applied to circuitry with a different number of coils, such as one or more than two coils. Also, while descriptions herein have described inductive circuitry comprising inductor coils, aspects described herein may apply equally to inductive circuitry using other types of inductive element having an inductance and suitable for generating a varying magnetic field to heat a susceptor arrangement.

While some of the example circuits described herein make use of silicon FETs for certain switching functions other suitable components may be used in place of such FETs. For example, components comprising wide bandgap materials such as silicon carbide, SiC, or gallium nitride, GaN, may be used. Such components may in some examples be FETs but in other examples may be high electron mobility transistors (HEMT). Such components may be faster and have higher breakdown voltages than silicon FETs which may be advantageous in some examples.

The above embodiments are to be understood as illustrative examples of the present disclosure. Further embodiments of the present disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

The invention claimed is:

1. Apparatus for an aerosol generating device, comprising:
   an induction heating circuit, the circuit comprising:
   an inductive element for inductively heating a susceptor arrangement to heat an aerosol generating material to thereby generate an aerosol;
   a capacitive element; and
   a switching arrangement that in use alternates between a first state and a second state to enable a varying current to be generated from a DC voltage supply and flow through the inductive element to cause inductive heating of the susceptor arrangement; and
   a control arrangement, wherein the control arrangement is configured to switch the switching arrangement from the first state to the second state in response to a first voltage condition being detected in the circuit, and the control arrangement is configured to switch the switching arrangement from the second state to the first state in response to a second voltage condition being detected in the circuit.

2. Apparatus according to claim 1 wherein the first voltage condition is indicative of an amount of magnetic energy which is stored in the inductive element due to the DC current flowing through the inductive element.

3. Apparatus according to claim 2 wherein the circuit further comprises a resistor and the voltage indicative of the amount of DC current flowing through the inductive element is dependent on a voltage across the resistor.

4. Apparatus according to claim 2 wherein the second voltage condition is indicative that a given proportion of a cycle of current oscillation between the inductive element and the capacitive element has been completed since the switching arrangement was configured from the first state to the second state.

5. Apparatus according to claim 4 wherein the control arrangement comprises a zero-voltage detector and the zero-voltage detector is configured to detect the second voltage condition, wherein the second voltage condition is a zero-voltage condition or a near zero-voltage condition across the switching arrangement which when detected by the zero-voltage detector is indicative that a half-cycle of current oscillation between the inductive element and the capacitive element has been completed since the switching arrangement was configured from the first state to the second state.

6. Apparatus according to claim 1 wherein:
   the switching arrangement in the first state allows a DC current to flow through the inductive element and thereby magnetic energy to be stored in the inductive element, and the switching arrangement in the second state prevents a DC current flowing through the inductive element such that when the switching arrangement is in the second state current may oscillate between the inductive element and the capacitive element.

7. Apparatus according to claim 6 wherein the control arrangement comprises a voltage comparator and the voltage comparator is configured to detect the first voltage condition by comparing a voltage indicative of the amount of DC current flowing through the inductive element to a control voltage.

8. Apparatus according to claim 7 wherein the control voltage is modifiable to control a power supplied to the circuit.

9. Apparatus according to claim 8 comprising a controller configured to determine a power supplied to the circuit and compare the power supplied to the circuit to a target power, and to control the control voltage based on the comparison between the power supplied to the circuit and the target power.

10. Apparatus according to claim 1 wherein the control arrangement comprises a flip-flop configurable between two states, and wherein the state of the switching arrangement is dependent on the state of the flip-flop, and wherein the control arrangement is configured to detect the first voltage condition and the second voltage condition and change the state of the flip-flop to change the state of the switching arrangement.

11. Apparatus according to claim 10 wherein the control arrangement comprises a comparator configured to detect the first voltage condition and wherein the flip-flop is configured to receive a first input from the comparator if the comparator detects the first voltage condition and a second input from the zero-voltage detector if the zero-voltage detector detects the second voltage condition.

12. Apparatus according to claim 1 wherein the switching arrangement comprises a FET.

13. Apparatus according to claim 12 wherein the control arrangement is configured to switch the state of the FET by selectively causing a voltage to be provided to a gate terminal of the FET.

14. Apparatus according to claim 1, wherein the inductive element and the capacitive element are arranged in parallel with one another in the induction heating circuit.

15. Apparatus according to claim 1 wherein the inductive element, capacitive element and switching arrangement are arranged in a first resonator section and the apparatus further comprises a second resonator section comprising a second inductive element, a second capacitive element and a second switching arrangement, wherein:
- the second inductive element is configured for inductively heating the susceptor arrangement to heat an aerosol generating material to thereby generate an aerosol;
- the second switching arrangement in use alternates between a first state and a second state to enable a varying current to be generated from the DC voltage supply and flow through the second inductive element to cause inductive heating of the susceptor arrangement; and
- the control arrangement is configured when the first resonator section is active to:
- switch the first switching arrangement from the first state to the second state in response to the first voltage condition being detected in the first resonator section circuit; and
- switch the first switching arrangement from the second state to the first state in response to the second voltage condition being detected in the first resonator section; and
- the control arrangement is configured when the second resonator section is active to:
- switch the second switching arrangement from the first state to the second state in response to the first voltage condition being detected in the second resonator section circuit; and
- switch the second switching arrangement from the second state to the first state in response to the second voltage condition being detected in the second resonator section.

16. Apparatus according to claim 15 comprising a controller configured to selectively activate the first resonator section and the second resonator section such that only one of the first resonator section and the second resonator section is active at any one time.

17. An aerosol generating device comprising:
an induction heating circuit, the circuit comprising:
- an inductive element for inductively heating a susceptor arrangement to heat an aerosol generating material to thereby generate an aerosol;
- a capacitive element; and
- a switching arrangement that in use alternates between a first state and a second state to enable a varying current to be generated from a DC voltage supply and flow through the inductive element to cause inductive heating of the susceptor arrangement; and
- a control arrangement, wherein the control arrangement is configured to switch the switching arrangement from the first state to the second state in response to a first voltage condition being detected in the circuit, and the control arrangement is configured to switch the switching arrangement from the second state to the first state in response to a second voltage condition being detected in the circuit.

18. An aerosol generating device according to claim 17 wherein the device is a tobacco heating device, also known as a heat-not-burn device.

19. An aerosol generating system comprising the aerosol generating device according to claim 17 and an article comprising an aerosol generating material for being heated by the device in use to thereby generate an aerosol.

20. An aerosol generating system according to claim 19 wherein the device is a tobacco heating device, also known as a heat-not-burn device, and wherein the aerosol generating material comprises a tobacco material.

21. A control arrangement for controlling an induction heating circuit of an aerosol generating device, wherein:
- the control arrangement is configured to control a switching arrangement in the induction heating circuit to in use cause the switching arrangement to switch between a first state and a second state to enable a varying current to be generated from a DC voltage supply and flow through an inductive element in the inductive heating circuit to cause inductive heating of a susceptor arrangement; and wherein
- the control arrangement is configured to switch the switching arrangement from the first state to the second state in response to a first voltage condition being detected in the circuit, and the control arrangement is configured to switch the switching arrangement from the second state to the first state in response to a second voltage condition being detected in the circuit.

22. A control arrangement according to claim 21, wherein the control arrangement is configured to:
- detect the first voltage condition and the second voltage condition in the induction heating circuit; and
- in response to detecting the first voltage condition, switch the switching arrangement from the first state to the second state; and
- in response to detecting the second voltage condition, switch the switching arrangement from the second state to the first state.

* * * * *